US007788532B2

(12) United States Patent
Kawamura

(10) Patent No.: US 7,788,532 B2
(45) Date of Patent: Aug. 31, 2010

(54) STORAGE CONTROLLER, AND CONTROL METHOD OF THE SAME

(75) Inventor: Shunji Kawamura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 11/972,651

(22) Filed: Jan. 11, 2008

(65) Prior Publication Data

US 2008/0281879 A1 Nov. 13, 2008

(30) Foreign Application Priority Data

May 11, 2007 (JP) ............................. 2007-126345

(51) Int. Cl.
*G06F 11/00* (2006.01)
(52) U.S. Cl. ..................... 714/15; 707/652; 707/681
(58) Field of Classification Search ................. None
See application file for complete search history.

(56) References Cited

U.S. PATENT DOCUMENTS

2005/0028022 A1* 2/2005 Amano ......................... 714/2
2006/0242452 A1* 10/2006 Kaiya et al. .................. 714/2

FOREIGN PATENT DOCUMENTS

JP 2005-18738 1/2005

* cited by examiner

*Primary Examiner*—Charles Rones
*Assistant Examiner*—Belix M Ortiz
(74) *Attorney, Agent, or Firm*—Antonelli, Terry, Stout & Kraus, LLP.

(57) ABSTRACT

The storage controller of the present invention can efficiently execute recovery by using the storage contents of the primary volume and of the base volume as much as possible. The difference between the primary volume and the base volume is managed by using difference bitmaps that differ in the sections. At the time of recovery, the differences that occur after the restoration point and before the restoration point are managed in the respective bitmaps. The base volume can be used in the area updated only after the restoration point, and the primary volume can be used in the area updated only before the restoration point. In the areas that are updated before and after the restoration point, the data of the base volume is copied to the primary volume, and thereafter the journal data obtained up to the restoration point are written to the primary volume.

14 Claims, 24 Drawing Sheets

STORAGE CONTROLLER, AND CONTROL METHOD OF THE SAME

CROSS-REFERENCE TO RELATED APPLICATIONS

This application relates to and claims priority from Japanese Patent Application No. 2007-126345 filed on May 11, 2007, the entire disclosure of which is incorporated herein by reference.

BACKGROUND OF THE INVENTION

1. Field of the Invention

The present invention relates to a storage controller and a control method of the storage controller.

2. Description of the Related Art

Various organizations such as a company, medical institution, government organization, and education institution use a storage controller in order to efficiently manage a large amount of data that increases on a daily basis. A storage controller stores important data such as sales data, customer data and research data, thus it is necessary to prepare for loss of data caused by human errors. Hedges against the loss of data include a method for creating a backup of a volume on a regular basis.

However, creating a backup and restoring data require a long time. Also, since data can be restored only when a backup is created, a data backup is not convenient. Therefore, as another hedge, there is known a first conventional technology in which a snapshot of a volume is created and journal data is acquired every time when the volume is updated, to manage the journal data (Japanese Unexamined Patent Publication No. 2005-18738). However, in this conventional technology as well, it is necessary to create a snapshot, and there is room for improvement in terms of convenience.

Therefore, there is also known a second conventional technology that allows restoration of data at any given point in time by using journal data (U.S. Patent Application Publication No. 2005/0028022).

The second conventional technology uses a data volume to be protected, a secondary volume to which storage contents of the protected data volume at some point in time are copied, and a journal volume that stores journal data. In the second conventional technology, at the time of restoration, data is copied from the secondary volume to the data volume to match the storage contents of the data volume to storage contents of the secondary volume. Next, in the second conventional technology, the journal data up until a specified time point is read out from the journal volume, and then written to the data volume. Therefore, according to the second conventional technology, data can be restored at any give point in time in increments of an update unit (in units of journal data).

However, when the capacity of the journal volume is fixed, the journal volume will eventually be filled with journal data, thus it is difficult to extend the period in which restoration can be performed. In the case of a configuration in which the capacity of the journal volume can be expanded, three is a risk that most of the storage capacity that the storage controller has is consumed in management of the journal data.

Furthermore, in the second conventional technology, the amount of data copied from the secondary volume to the data volume increases easily, thus it takes a long time to complete restoration.

SUMMARY

The present invention is contrived in view of the above problems, and it is an object of the present invention to provide a storage controller capable of efficiently protecting data of a volume to be protected, and a control method of the storage controller. Another object of the present invention is to provide a storage controller capable of performing a high-speed restoration, and a control method of the storage controller. Yet another object of the present invention will become clear from the following descriptions of embodiments.

In order to solve the above problems, a storage controller for storing data that is used by an external device, according to the present invention, has: a first storage area that holds storage contents obtained at a latest point; a second storage area that holds storage contents obtained at a base point positioned before the latest point; an update history management section that manages an update history of the first storage area which is generated by an update request from the external device; and a controller that restores the storage contents of the first storage area that are obtained at a restoration point included in a period between the base point and the latest point, wherein the controller (1) detects a first update area that is updated during a first period between the restoration point and the latest point, a second update area that is updated during a second period between the base point and the restoration point, and a third update area that is common to both the first update area and the second update area, (2) uses storage contents of the second storage area with respect to the first update area, uses the storage contents of the first storage area with respect to the second update area, uses the storage contents of the second storage area and an update history obtained within the second period with respect to a third storage area, and uses the storage contents of either one of the first and second storage areas with respect to an unupdate area which is not updated during both the first period and the second period, and thereby (4) restores the storage contents of the first storage area that are obtained at the restoration point.

The controller may be configured so as to restore the storage contents of the first storage area, which are obtained at the restoration point, onto the first storage area.

The controller may be configured so as to restore the storage contents of the first storage area, which are obtained at the restoration point, onto the third storage area which is different from the first storage area and the second storage area.

The controller may be configured so as to restore the storage contents of the first storage area, which are obtained at the restoration point, onto a virtual storage area that is generated virtually.

In an embodiment of the present invention, the controller (4-1) generates the virtual storage area corresponding to the first storage area, (4-2) associates an area corresponding to the first update area in the virtual storage area with an area corresponding to the first update area in the second storage area, (4-3) associates an area corresponding to the second update area in the virtual storage area with an area corresponding to the second update area in the first storage area, (4-4) associates an area corresponding to the unupdate area in the virtual storage area with an area corresponding to the unupdate area in either one of the first and second storage areas, (4-5) associates an area corresponding to the third update area in the virtual storage area with a predetermined area corresponding to the third update area in either one of the first and third storage areas, copies, to the predetermined area, storage contents stored in an area corresponding to the third update area in the second storage area, thereafter writes update histories related to the third update area over the predetermined area in a predetermined order, and thereby restores the storage contents of the first storage area that are obtained at the restoration point.

The controller may be configured such that the update histories related to the third update area are applied to the predetermined area so as to sequentially trace back to the past from a time point proximate to the restoration point. In this case, the controller does not overwrite in a place to which is applied an update history obtained at a time point close to the restoration point, even when there exists an update history obtained in an earlier time than the update history. If an older update history is overwritten in an area to which a newer update history is already applied, the update history is set as data that is older than the restoration point.

The controller may be configured so as to use an update history managed by the update history management section to generate, in advance, information for detecting the first through third update areas, before the restoration point is designated.

The controller may be configured so as to manage, in advance, a position of a difference between the storage contents of the first storage area and the storage contents of the second storage area, for each of predetermined sections, on the basis of the update request issued from the external device during the period between the base point and the latest point, and detects the first through third update areas on the basis of the position of the difference of each section.

The controller may be configured so as to use a plurality of first difference bitmaps to manage a position in which the difference in storage contents is generated between the first storage area and the second storage area, for each of predetermined sections, detects the first update area from a logical sum of a plurality of the first difference bitmaps obtained after the restoration point, detects the second update area from a logical sum of a plurality of the first difference bitmaps obtained before the restoration point, and detects the third update area from an overlapping section between the first update area and the second update area.

In the embodiment of the present invention, the first storage area and the second storage area are each configured as a logical volume, and the update history management section generates journal data items on the basis of the update request issued from the external device and saves the journal data items as the update histories.

In the embodiment of the present invention, the controller generates a table for associating the first storage area with the virtual storage area generated virtually, the table is configured so as to associate an area corresponding to the first update area in the virtual storage area with an area corresponding to the first update area in the second storage area, associate an area corresponding to the second update area in the virtual storage area with an area corresponding to the first update area in the first storage area, and associate an area corresponding to the unupdate area in the virtual storage area with an area corresponding to the unupdate area in either one of the first and second storage areas, and an area corresponding to the third update area in the virtual storage area is set as an area for performing predetermined processing, the predetermined processing being processing for copying, to the predetermined area, storage contents that are stored in an area corresponding to the third update area in the second storage area, and thereafter overwriting update histories related to the third update area in a predetermined order.

A storage controller for storing data that is used by an external device, according to another aspect of the present invention, has: a first volume that holds storage contents obtained at a latest point; a second volume that holds storage contents of the first volume obtained at a base point; a third volume that stores journal data items generated based on an update request targeted to the first volume; a plurality of first difference bitmaps for managing a position at which a difference in storage contents between the first volume and the second volume is generated, for each of a plurality of predetermined sections; and a controller for controlling the first volume, the second volume, the third volume, and each of the first difference bitmaps, wherein the controller executes (1) a copy function for storing, in the second volume, the storage contents of the first volume that are obtained at a predetermined time point, (2) a journal generating function for generating the journal data items on the basis of the update request sent from the external device and causing the generated journal data items to be stored in the third volume, (3) a difference management function for causing the position, at which a difference between the first volume and the second volume is generated, to be stored in one of the first difference bitmaps which is selected for the each predetermined section, on the basis of the update request that is issued from the external device after the predetermined time point, (4) a reflection function for causing predetermined journal data items obtained after a lapse of a pre-designated targeted protection period, from among the journal data items stored in the third volume, to be reflected in the second volume (5) a journal discarding function for discarding the predetermined journal data items reflected by the second volume, (6) a reusing function for deleting storage contents of a predetermined first difference bitmap from among the first difference bitmaps, the predetermined first difference bitmap having all corresponding journal data items discarded, and reusing thus obtained first difference bitmap as a new first difference bitmap, and (7) a restoration function, which, when a restoration point is designated and execution of restoration is commanded, (7-1) detects, from a logical sum of a plurality of the first difference bitmaps obtained after the restoration point, a first update area that is updated during a first period between the restoration point and the latest point, (7-2) detects, from a logical sum of a plurality of the first difference bitmaps obtained before the restoration point, a second update area that is updated during a second period between the base point and the restoration point, (7-3) detects a third update area that is common to both the first update area and the second update area, and (7-4) uses the storage contents of the second volume with respect to the first update area, uses the storage contents of the first volume with respect to the second update area, copies, to a predetermined area, storage contents stored in an area corresponding to the third update area in the second volume, with respect to the third update area, and thereafter writes journal data items related to the third update area over the predetermined area in a predetermined order, and, with respect to an unupdate area which is not updated during both the first period and the second period, uses the storage contents stored in either one of the first and second storage areas to acquire the storage contents of the first volume that are obtained at the restoration point.

According to yet another aspect of the present invention, a method for controlling the storage controller for storing data used by an external device has the steps of: causing storage contents obtained at a latest point to be held in a first storage area; causing storage contents obtained at a base point positioned before the latest point to be held in a second storage area; causing an update history management section to manage an update history of the first storage area which is generated by an update request sent from the external device;

detecting, when a restoration point is designated and restoration is commanded, a first update area that is updated during a first period between the restoration point and the latest point, a second update area that is updated during a second period between the base point and the restoration point, and a third update area that is common to both the first update area and the second update area; and using storage contents of the second storage area with respect to the first update area, using the storage contents of the first storage area with respect to the second update area, using the storage contents of the second storage area and an update history obtained during the second period with respect to the third update area, using the storage contents of either one of the first and second storage areas with respect to an unupdate area which is not updated during both the first period and the second period, and thereby restoring the storage contents of the first storage area that are obtained at the restoration point.

At least some of the sections, functions and steps of the present invention sometimes can be realized by a computer program. Such computer program is stored in, for example, a storage device, or distributed via a communication network.

BRIEF DESCRIPTION OF THE DRAWINGS

FIG. 3 is an explanatory diagram showing a general outline of a program configuration of the storage controller and the like;

DESCRIPTION OF THE PREFERRED EMBODIMENTS

Figure 1:
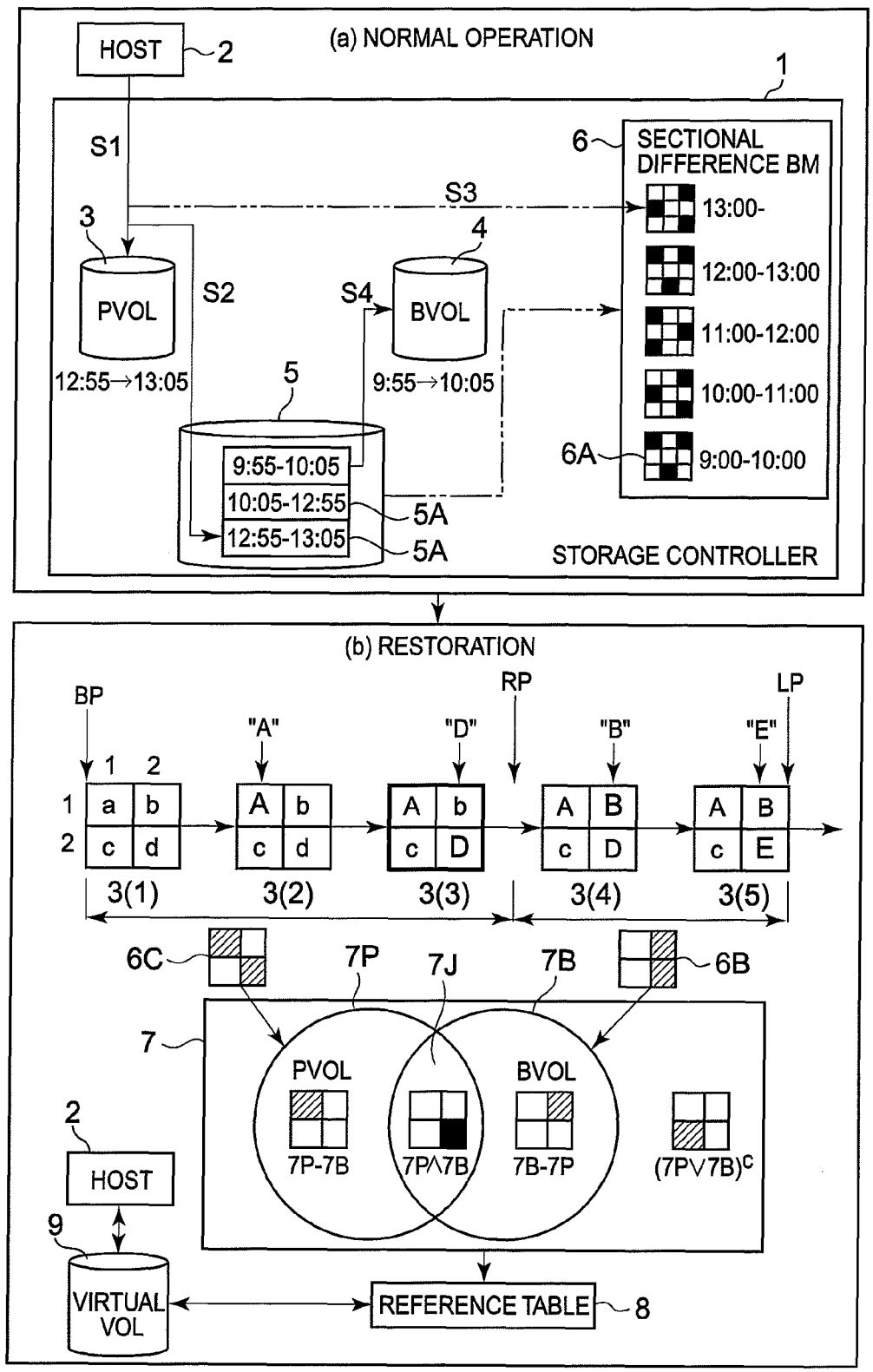
FIG. 1 is an explanatory diagram showing a simple outline of an embodiment of the present invention.

FIG. 1 is an explanatory diagram showing a general outline of an embodiment of the present invention. FIG. 1 shows a general outline of an information processing system that has a storage controller 1 according to the present embodiment. FIG. 1A shows a schematic operation performed during a normal operation, and FIG. 1B shows a schematic operation performed during restoration.

First, FIG. 1A is referenced. This information processing system has, for example, the storage controller 1 and a host 2 which is an "external device" or "host device". As is clear from the following embodiments, the information processing system can further have a management server 30 and a storage controller 40.

The storage controller 1 has a plurality of physical storage devices, such as a hard disk drive and a flash memory device. A physical storage area of each of these physical storage devices is virtualized, whereby a logical storage device is created. The logical storage device is called "logical volume" or "volume" hereinafter.

The storage controller 1 can further have, for example, a protection target volume ("PVOL" shown in the figures) 3, a base volume ("BVOL" shown in the figures) 4, a journal volume 5, and a sectional difference bitmap 6.

The protection target volume 3 is a volume in which storage contents thereof are continuously protected by journal data. A technology of continuously restoring data, which is stored in the protection target volume 3, at any restoration point that can be designated is called "CDP (continuous data protection)" in the present specification. Hereinafter, the protection target volume 3 is sometimes called "primary volume 3" for convenience of explanation.

The primary volume 3 is connected to the host 2 and stores data written from the host 2. The host 2 can write data into the primary volume 3 or read data from the primary volume 3. The base volume 4 stores the data that is stored in the primary volume at a predetermined time point (base time point). As described hereinafter, journal data items after a lapse of a targeted protection period are successively written into the base volume 4. Therefore, the base volume 4 stores storage contents that are obtained a predetermined time period (targeted protection period) earlier than a point of time when the latest storage contents of the primary volume 3 are obtained. A past time point in the primary volume 3 that is shown by the base volume 4 is called "base point". The base point changes in accordance with passage of actual time. A change in the base point is sometimes called "base point shift".

It should be noted that a time difference between the storage contents of the base volume 4 and the storage contents of the primary volume 3 is not necessarily fixed. The time difference between the storage contents of the base volume 4 and the storage contents of the primary volume 3 sometimes changes.

The journal volume 5 is a volume for saving journal data 5A. The journal data 5A is the data for managing histories in which the primary volume 3 is updated by the host 2. Therefore, the journal data 5A can be called "update history management data", and the journal volume 5 can be called "update history management volume".

The sectional difference bitmap 6 is a difference bitmap which is prepared for each of predetermined sections that are set beforehand. The sectional difference bitmap 6 manages the presence/absence of an update of the primary volume 3 in increments of a predetermined unit such as slot unit. A slot means, for example, a logical track. A section can be defined according to time or usage rate of the journal volume 5. Bit 1 is set in an updated position, and bit 0 is set in a position which is not updated. A bit that indicates a position where a difference is generated is called "difference bit".

In one example, a different difference bitmap 6A can be used every predetermined time ("one hour" in FIG. 1). Specifically, a difference bitmap 6A (9:00-10:00) can be used between 9 o'clock and 10 o'clock and the difference can be managed. Another difference bitmap 6A (10:00-11:00) can be used during a subsequent time period between 10 o'clock and 11 o'clock and the difference can be managed.

In another example, amount of accumulated journal data is separately managed after switching the difference bitmap 6A, and when the managed journal data amount becomes a predetermined percentage of the entire journal volume 5, switching is made to another difference bitmap 6A.

The targeted protection period means a period in which the storage contents of the primary volume 3 can be restored, and is set to, for example, "three hours" in advance. Basically, a time period in which the storage contents of the primary volume 3 are actually protected matches the targeted protection period, but the targeted protection period sometimes does not match the actual protection period, as described in the following embodiments.

Journal data items 5A after a lapse of the targeted protection period are sequentially written to the base volume 4. Accordingly, the storage contents of the base volume 4 are subsequently updated later than the storage contents of the primary volume 3 by the targeted protection period.

The operation performed during normal operation is described. First, a user specifies the primary volume 3 to be protected and the targeted protection period. The storage controller 1 copies all data items stored in the primary volume 3 to the base volume 4. In the example shown in FIG. 1A, the data obtained at 9 o'clock is copied to the base volume 4. Specifically, FIG. 1A shows the case where the CDP start time shows 9 o'clock.

The host 2 accesses the primary volume 3 to read and write the data items. When a write data item that is transmitted from the host 2 is written to the primary volume 3 (S1), i.e., when a write request targeted to the primary volume 3 is issued from the host 2, the storage controller 1 creates a journal data item 5A on the basis of this write request. The generated journal data item 5A is saved in the journal volume 5 (S2).

It should be noted that there is a time where the host 2 writes data to the primary volume 3 while the storage contents existing in the primary volume 3 at a certain time point are copied to the base volume 4. Next is described a case in which the host 2 requests to write new data to an uncopied area where a copy from the primary volume 3 to the base volume 4 is not completed.

In this case, for example, the storage controller 1 copies the data items stored in the uncopied area (old data items) to the base volume 4 from the primary volume 3, and then writes new data items from the host 2 to the primary volume 3.

In another example, there is a method for providing an attributed, such as "new data", to a write data item related to a new write request that is issued during copying from the primary volume 3 to the base volume 4, and this new data is managed on a cache memory separately from the old data stored in the uncopied area. In this example, copying the old data from the primary volume 3 to the base volume 4 and processing of the write request issued from the host 2 (overwriting the new data) can be performed asynchronously. There is also another method.

A position at which the primary volume 3 is updated by the host 2 is stored in the difference bitmap 6A, which is in charge of a period (section) included in the time of issuance of a write request (S3). The updated position can be managed in increments of a predetermined unit such as slot unit or block unit.

When the first period taken in charge by the difference bitmap 6A elapses, the storage controller 1 switches the difference bitmap 6A to another new difference bitmap 6A to manage the position at which the primary volume 3 is updated by the host 2.

After the targeted protection period elapses since the CDP start time, the journal data items 5A after a lapse of the targeted protection period are written sequentially to the base volume 4 (S4). Specifically, when the current time passes 12 o'clock, the journal data items that are generated the targeted protection period (three hours) before the current time (12 o'clock) are written to the base volume 4 in the order of generation. The journal data items 5A written to the base volume 4 are discarded.

In the present specification, the operation of writing the journal data items 5A into the base volume 4 or the primary volume 3 and updating the storage contents of the base volume 4 or the primary volume 3 is sometimes called "reflection" or "reflect".

FIG. 1 also shows a situation where more time elapses. When the current time shows "13:05", it means that the journal data items 5A created between "9:55" and "10:05" are saved for longer than the targeted protection period, thus these journal data items are written to the base volume 4. Therefore, the storage contents of the base volume 4 match the storage contents of the primary volume 3 obtained at "10:05", which is three hours before the current time. In this manner, at the time of the normal operation, the storage contents of the base volume 4 are subsequently updated later than the storage contents of the primary volume 3 by the targeted protection period.

Out of the sectional difference bitmaps 6A, sectional difference bitmaps 6A that are obtained by writing all self-managed journal data items 5A into the base volume 4 are reused after the storage contents there of are deleted. For example, when the current time is "13:05", the base point is "10:05" which is three hours before the current time. Each of the journal data items 5A, which is associated with the difference bitmap 6A (9:00-10:00) in charge of the section "9:00-10:00", is already written to the base volume 4.

Therefore, this difference bitmap 6A (9:00-10:00) is already used, and thus does not have to be saved. Therefore, the storage contents of the difference bitmap 6A (9:00-10:00) are deleted and reused in order to manage another new sectional difference.

The operation of restoration is described with reference to FIG. 1B. For example, there is a possibility that errors occur in the storage contents of the primary volume 3 due to a failure or an erroneous operation of the user that has occurred on an application program of the host 2.

When errors occur in the storage contents of the primary volume 3, the user issues an instruction for restoring the storage contents of the primary volume 3 until a desired time point. The user can select any time point within a protection period, as a restoration point (restoring point).

Before explaining a situation of the restoration processing, changes in the storage contents of the primary volume 3 are described. The storage contents of the primary volume 3 obtained at a base point (BP in the figure) are shown as 3(1) in FIG. 1B. The storage contents of the primary volume 3(1) at this base point BP are copied to the base volume 4. Here, for convenience of explanation, there is shown an example in which the entire storage area of the primary volume 3 is divided into four areas. In the example shown in FIG. 1B, each of the four areas is an update unit. FIG. 1B shows an X-axis coordinate and a Y-axis coordinate so that each of the areas can be specified. The primary volume 3 is provided with codes (1) through (5) according to a lapse of time.

Note a primary volume 3(2) obtained at a certain time point after a lapse of time since the base point BP. The host device 2 writes new data "A" into the upper left area (1, 1) of the primary volume 3(2). Therefore, in place of the old data "a", the new data "A" is stored in the upper left area (1, 1) of the primary volume 3(2).

Note a primary volume 3(3) obtained at another certain time point after a further lapse of time. The host device 2 writes new data "D" into the lower right area (2, 2) of the primary volume 3(3). Therefore, in place of the old data "d", the new data "D" is stored in the lower right area (2, 2) of the primary volume 3(3).

Similarly, the host device 2 writes new data "B" into the upper right area (2, 1) of a primary volume 3(4). Therefore, in place of the old data "b", the new data "B" is stored in the upper right area (2, 1) of the primary volume 3(4).

At the latest point (LP), the host device 2 writes new data "E" into the lower right area (2, 2) of a primary volume 3(5). Therefore, the in place of the old data "D", the new data "E" is stored in the lower right area (2, 2).

The user or the application program can make a request for restoration by designating a time between the base point BP and the latest point LP. Here, for convenience of explanation, a restoration point (RP in the figure) is designated between the time at which the data "D" is written to the primary volume 3(3) and the time at which the data "B" is written to the primary volume 3(4).

The storage controller 1 obtains a logical sum of the sectional difference bitmaps 6A managing, respectively, the positions where the primary volumes 3 are updated during a first period between the restoration point RP and the latest point LP, and thereby obtains a difference bitmap 6B. Similarly, the storage controller 1 obtains a logical sum of the sectional difference bitmaps 6A managing, respectively, the positions where the primary volumes 3 are updated during a second period between the base point BP and the restoration point RP, and thereby obtains another difference bitmap 6C.

The difference bitmap 6B indicates all updated positions occurred during the first period between the restoration point RP and the latest point LP. Therefore, the difference bitmap 6B can be called, for example, "difference bitmap after restoration point". The difference bitmap 6C indicates all updated positions occurred during the second period between the base point BP and the restoration point RP. Therefore, the difference bitmap 6C can be called, for example, "difference bitmap before restoration point".

In the figure, the updated areas in each of the difference bitmaps 6B and 6C are marked with diagonal lines, and unupdated areas of the same are shown as blanks. The updated areas (areas with diagonal lines) of the difference bitmap after restoration point 6B correspond to a first update area. The updated areas of the difference bitmap 6C before restoration point correspond to a second update area. The updated area (2, 2) of each of the difference bitmaps 6B and 6C corresponds to a third update area. The area (1, 2) of each of the difference bitmaps 6B and 6C, which is not updated, corresponds to an unupdate area.

The whole storage areas of the primary volume 3 can be classified into four groups on the basis of the two difference bitmaps 6B and 6C. By using the primary volume 3, base volume 4 and journal volume 5 in accordance with the type of the group, efficient restoration processing can be executed. In the following description, each of the groups 7B, 7P, 7C and the like is expressed with a plurality of assembly codes. Also, for deeper understanding, the area belonging to each group is shown using the coordinates of each area shown in FIG. 1.

The first group 7B indicates the areas, in each of which the occurrence of an update is detected by the difference bitmap after restoration point 6B. The first group 7B is constituted by the first update area. The areas belonging to the first group 7B can basically use the data of the base volume 4. Especially in the areas belonging only to the first group 7B (7B-7P, ($\neg$7P) $\wedge$7B), the data stored in the base volume 4 can be used as is. Specifically, the area (2, 1) that belongs only to the first group 7B in FIG. 1 is updated only after the restoration point, but is not updated before the restoration point. Therefore, in the area (2, 1) that belongs only to the first group 7B, the data "b" of the base volume 4 matches the data "b" obtained at the restoration point.

The second group 7P indicates the areas, in each of which the occurrence of an update is detected by the difference bitmap before restoration point 6C. The second group 7P is constituted by the second update area. The areas belonging to the second group 7P can basically use the data of the primary volume 3. Especially in the areas belonging only to the second group 7P (7P-7B, 7P$\wedge$($\neg$7B)), the data stored in the primary volume 3 can be used as is. Specifically, the area (1, 1) that belongs only to the second group 7P in FIG. 1 is updated only before the restoration point, but is not updated after the restoration point. Therefore, in the area (1, 1) that belongs only to the second group 7P, the data "A" of the primary volume 3 matches the data "A" obtained at the restoration point.

The third group 7J indicates the area where the first group 7B and the second group 7P overlap with each other. The third group 7J is constituted by the third update area. The area (7P $\wedge$7B) belonging to the third update area 7J cannot directly use any data stored in the primary volume 3 and base volume 4. This is because the area (2, 2) belonging to the third group 7J as shown in FIG. 1 is updated before and after the restoration point. Therefore, in the area (2, 2) belonging to the third group 7J, first, the data "d" of the base volume 4 is copied to the primary volume 3, ("E"→"d"), and then the journal data items 5A up until the restoration point, which are related to the area (2, 2), are sequentially written over the area (2, 2) ("d"→"D"). Accordingly, the data in the area belonging to the third group 7J matches the data obtained at the restoration point.

The fourth group is an area which does not belong to any of the groups 7B, 7P and 7J ((7P$\vee$7B)$^c$, $\neg$(7P$\vee$7B)), the area being one of the entire storage areas of the primary volume 3. The area belonging to the fourth group is not updated before or after the restoration point, and thus can use the data stored in either the primary volume 3 or the base volume 4. In the area (1, 2) belonging to the fourth group as shown in FIG. 1, the data stored in the primary volume 3, the data stored in the base volume 4, and the data obtained at the restoration point are all "c".

Therefore, the storage controller 1 uses the difference bitmap after restoration point 6B at the time of restoration, and thereby copies the data from the base volume 4 to the primary volume 3 in relation to the areas (2, 1) and (2, 2) that belong to the first group 7B. As described above, in the areas belonging to the second group 7P, basically the data stored in the primary volume 3 can be used, thus it is not necessary to copy the data from the base volume 4 to the primary volume 3. The storage controller 1 reads the journal data 5A up until the restoration point, sequentially, and writes these journal data items over the area (2, 2) belonging to the third group 7J.

It should be noted that the area (1, 2) belonging to the fourth group is not updated before or after the restoration point, thus the data stored in the primary volume 3 and the base volume 4 can be used as the data of the restoration point. Therefore, the storage controller 1 uses, as the data in the restoration point, the data of the primary volume 3 in relation to the area belonging to the fourth group. Accordingly, the storage controller 1 (1) copies the data from the base volume 4 to the primary volume 3 in relation to the areas belonging to the first group 7B, (2) copies the data from the base volume 4 to the primary volume 3 in relation to the area belonging to the third group 7J, and thereby (3) complete restoration.

The above has described the case in which the storage contents of the primary volume 3 are restored from the storage contents obtained at the latest point to the storage contents obtained at the restoration point. However, as it will be clear from the following description, the storage contents obtained at the restoration point can be restored by using various methods.

For example, as shown the lower part of FIG. 1(*b*), the storage contents obtained at the restoration point can be reproduced in a virtual volume 9. The virtual volume 9 is associated with the primary volume 3 and the base volume 4 via a reference table 8.

Specifically, of the entire areas within the virtual volume 9, the areas belonging only to the first group 7B are associated with the base volume 4, the areas belonging only to the second group 7P are associated with the primary volume 3, and the area belonging to the fourth group is associated with the primary volume 3 or the base volume 4.

When the host 2 accesses the area belonging to the third group 7J, the storage controller 1 can copy the data of the base volume 4 that corresponds to this area to the primary volume 3, and then sequentially overwrite the journal data items up until the restoration point, in relation to this area.

When the host 2 accesses the areas belonging to the first group 7B, the storage controller 1 copies the data of the base volume 4 that corresponds to these areas to the primary volume 3. It should be noted that, in the case of a write access, the storage controller 1 copies the data stored in the base volume 4 to the primary volume 3, accepts a write access for the data, and then stores new write data.

By using the virtual volume 9 in this manner, a completion of restoration can be reported to the host 2 before data copy is performed. Furthermore, it is only necessary to perform data copy and the like when access is made from the host 2, thus the time required in restoration can be reduced.

The present embodiment is configured as described above, thus the following effects can be achieved. In the present embodiment, during the normal operation, the journal data items 5A after a lapse of the targeted protection period are written to the base volume 4, whereby the storage contents of the base volume 4 can be subsequently transferred later than the storage contents of the primary volume 3 by the targeted protection period. Therefore, the base point, which is a starting point of a period in which restoration can be performed, can be caused to follow a certain time period later than the current time. Since the journal data items 5A that are written to the base volume 4 are discarded, the risk that the journal volume 5 is filled with the journal data items 5A can be reduced.

The present embodiment has a configuration in which the difference bitmaps 6A are allocated respectively to a plurality of predetermined sections, and the difference between the primary volume 3 and the base volume 4 is managed for each section. Therefore, after the journal data items 5A associated with the difference bitmaps 6A are all written to the base volume 4, the storage contents of the difference bitmaps 6A are deleted (zero-cleared) and reused. Accordingly, unwanted difference bitmaps 6A can be prevented from being remaining stored in the memory areas of the storage controller 1, and the memory areas of the storage controller 1 can be used efficiently.

On the other hand, there is considered a case in which one of the difference bitmaps is used via the whole sections, i.e., a case in which the difference between the primary volume 3 and the base volume 4 is managed by a single difference bitmap. In this case, once the difference bit is set to bit 1, it cannot be changed to bit 0, and excess difference bits (bits that are set to bit 1) are accumulated as time advances.

It is not a problem even when the difference bits corresponding to the journal data items 5A written to the base volume 4 are set to bit "0", but thereafter different data may be written over the same place, thus the difference bit cannot be changed from bit 1 to bit 0.

Therefore, when a single difference bitmap is used, excess difference bits are accumulated as time advances, whereby the amount of data copied from the base volume 4 to the primary volume 3 at the time of restoration increases. As a result, the time required for restoring the storage contents of the primary volume 3 to the storage contents of the base point increases, and a long time is required for recovery. In the present embodiment, different difference bitmaps 6A are used for the sections respectively, thus unwanted difference bits can be prevented from being accumulated, the amount of copies at the time of restoration can be reduced, and the time required for recovery can be reduced. Moreover, in the present embodiment, the storage contents of the unwanted difference bitmaps 6A can be deleted and reused, thus the memory areas of the storage controller 1 can be used efficiently.

In the present embodiment, the difference generated between the primary volume 3 and the base volume 4 is comprehended before and after the restoration point, and data copy and the like area controlled in accordance with the characteristics of each area within the primary volume 3. Therefore, the amount of data to be copied from the base volume 4 to the primary volume 3 at the time of restoration and the amount of journal data to be written can be reduced, and thereby the time required in restoration can also be reduced.

The storage controller 1 of the present embodiment is configured not only as shown in FIG. 1 but also as described in described in the following embodiments. Moreover, management of the journal data items 5A and management of the difference bitmaps 6A can be performed outside the storage controller 1. For example, the host 2 or another computer device connected to the host 2 can be configured to perform journal management and/or difference management. Hereinafter, the embodiments of the present invention are described in detail.

Embodiment 1

Figure 2:
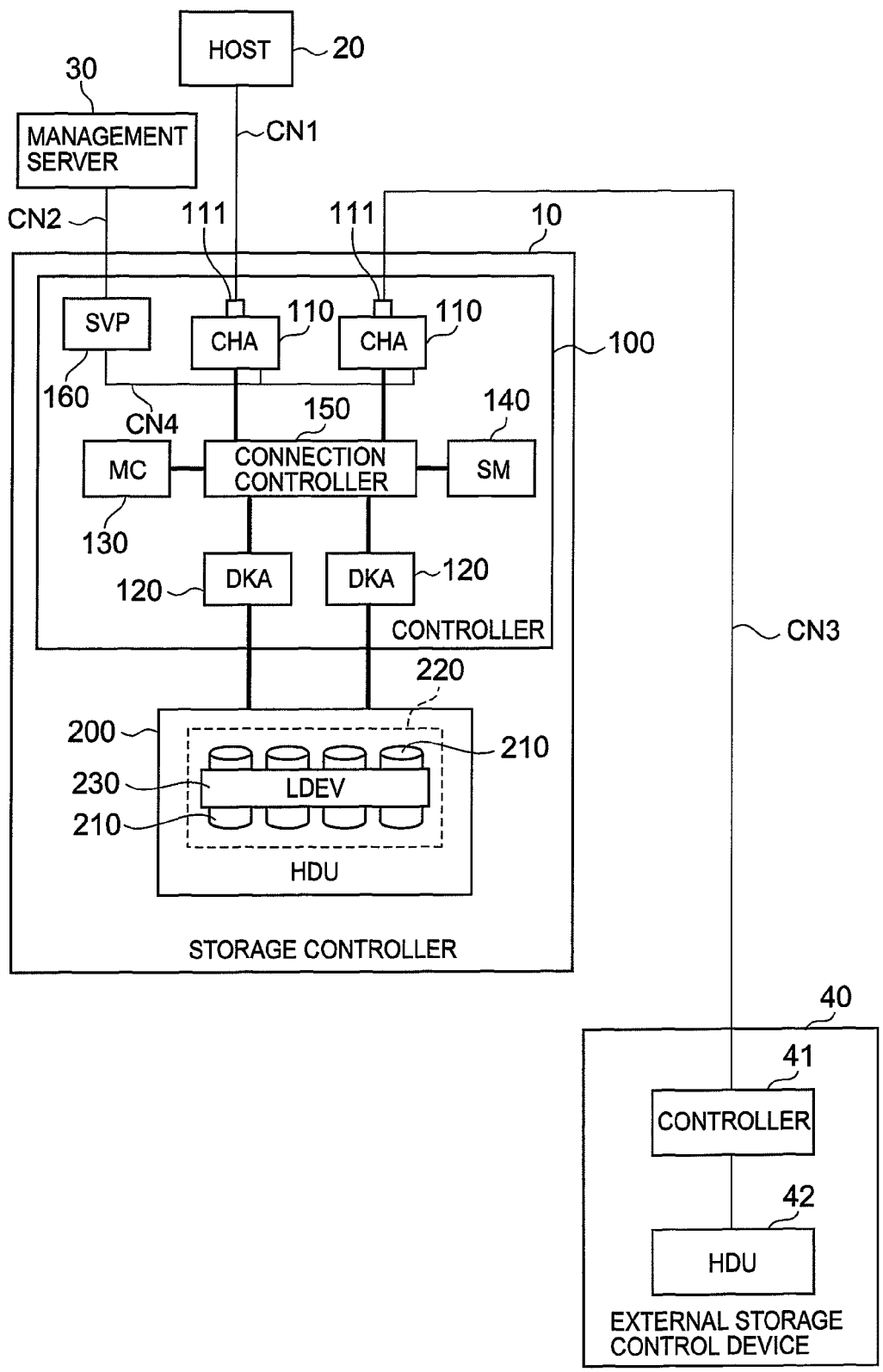
FIG. 2 is an explanatory diagram showing the entire configuration of an information processing system that has the storage controller according to the embodiment of the present invention.

FIG. 2 is an explanatory diagram that schematically shows a hardware configuration of an information processing system having a storage controller 10 according to the present embodiment. Before describing the present embodiment, the relationship between the embodiment shown in FIG. 1 and the following embodiment is explained.

The storage controller 10 as "storage controller" corresponds to the storage controller 1 shown in FIG. 1, and a host 20 as "host device" corresponds to the host 2 shown in FIG. 1. The management server 30 that can be expressed as "management device" is not illustrated in FIG. 1.

A primary volume 230P (see FIG. 4) as "first storage area" or "first volume" corresponds to the primary volume 3 shown in FIG. 1. A base volume 230B (see FIG. 4) as "second storage area" or "second volume" corresponds to the base volume 4 shown in FIG. 1. A journal volume 230J (see FIG. 4) as "update history management section" or "third volume" corresponds to the journal volume 5 shown in FIG. 1.

Journal data JD (see FIG. 4) as "journal data" corresponds to the journal data 5A shown in FIG. 1. A sectional difference bitmap BM20 (see FIG. 4) as "first difference bitmap" corresponds to the sectional difference bitmap 6A shown in FIG. 1. A controller 100 as "controller" is not illustrated in FIG. 1.

Figure 4:
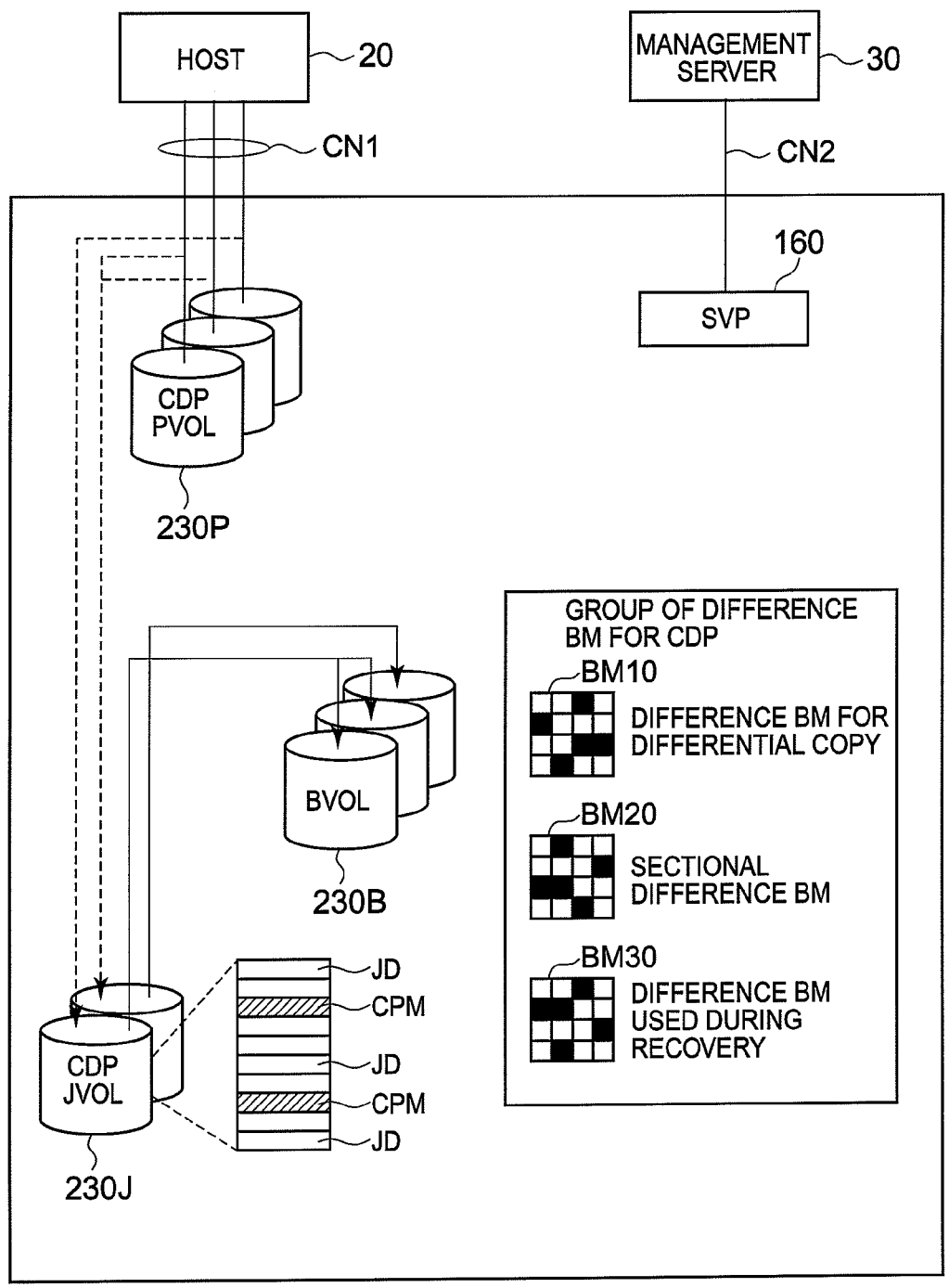
FIG. 4 is an explanatory diagram showing a general outline of a logical configuration of the storage controller.

A difference bitmap for differential copying (or a difference bitmap for initial copy) BM10 as "second difference bitmap" shown in FIG. 4 corresponds to the difference bitmap 6B shown in FIG. 1.

Temporary restoration, which is described hereinafter, can be called "first restoration", and "complete restoration", which is also described hereinafter, can be called "second restoration". Temporary restoration is performed in order to temporarily recover the storage contents obtained at the restoration point, while complete restoration is the processing for confirming the recovered storage contents. After temporary restoration is performed once or a number of times, the user or the application program can instruct complete restoration. The user or the application program can also directly instruct execution of complete restoration without performing temporary restoration.

Returning to FIG. 1, the host 20 and the storage controller 10 are connected to each other via a communication path CN1 such as a SAN (Storage Area Network) so as to be able to perform two-way communication. The host 20 is configured as a computer device such as a server computer, mainframe computer, and workstation computer.

When the host 20 is a mainframe computer, data transfer is carried out in accordance with the communication protocols such as FICON (Fibre Connection™), ESCON (Enterprise System Connection™), ACONARC (Advanced Connection Architecture™), and FIBARC (Fibre Connection Architecture™).

Besides the above dedicated protocols, the host 20 and the storage controller 10 can perform data transfer by means of various communication protocols such as iSCSI (Internet Small Computer System Interface), TCP/IP (Transmission Control Protocol/Internet Protocol), and FCP (Fibre Channel Protocol).

The storage controller 10 can further play a role of managing the resources stored in the system, in an integrated fashion. For example, the storage controller 10 can have a function of virtualizing the physical storage resources existing in the system and providing them to the host 20. Specifically, the storage controller 10 makes itself seem to the host 20 that as if the storage controller 10 owns the storage resources of an external storage control device 40. In this manner, the storage controller 10 can have an aspect of a virtual device for virtualizing the storage resources existing in the system. Focusing on this aspect, the storage controller 10 does not have to be configured as a disk array or the like, and thus can be configured as another device such as a fibre channel switch.

The configuration of the storage controller 10 is described. The storage controller 10 can be roughly divided into a controller 100 and a storage device unit ("HDU", hereinafter). The controller 100 is for controlling the operation of the storage controller 10. The controller 100 is constituted by, for example, channel adopters ("CHA", hereinafter) 110, disk adopters ("DKA", hereinafter) 120, cache memory ("CM" shown in the figure) 130, shared memory ("SM" shown in the figure) 140, a connection controller 150, and a service processor ("SVP", hereinafter) 160.

The CHA 110 is for controlling data communication between the CHA 110 and the host 20, and is configured as a computer device having, for example, a microprocessor, local memory, and the like. Each CHA 110 has at least one communication port 111. Identification information such as WWN (World Wide Name) is set in the communication port 111. When the host 20 and the storage controller 10 perform data communication by means of the iSCSI (Internet Small Computer System Interface) or the like, identification information such as an IP (Internet Protocol) address or the like is set in the communication port 111.

FIG. 2 shows two types of CHA 110. One of the CHA 110 located on the left side of FIG. 2 is for receiving and processing a command sent from the host 20, and the communication port 111 thereof is configured as a target port. The other CHA 110 located on the right side of FIG. 2 is for issuing a command to the external storage control device 40, and the communication port 111 thereof is configured as an initiator port.

The DKA 120 is for controlling data communication performed between the DKA 120 and each of disk drives 210 within HDU 200, and is configured as a computer device having a microprocessor and local memory, as with the CHA 110.

Each DKA 120 and each disk drive 210 perform data transfer in units of blocks in accordance with, for example, a fibre channel protocol. A path used by the controller 100 to access each disk drive 210 is made redundant. Even if a failure occurs in either one of the DKA 120 or in a communication path, the controller 100 can use the other DKA 120 or communication path to access the disk drive 210. Similarly, a path between the host 20 and the controller 100 and a path between the external storage control device 40 and the controller 100 can be made redundant.

The operations of the CHA 110 and DKA 120 are simply described. Once receiving a read command issued from the host 20, the CHA 110 causes the shared memory 140 to store the read command. The DKA 120 refers to the shared memory 140 as needed. When the DKA 120 discovers an unprocessed read command, the DKA 120 reads data from the disk drive 210 and causes the cache memory 130 to store the data. The CHA 110 reads the data moved to the cache memory 130, and transmits the data to the host 20.

Once receiving a write command issued from the host 20, the CHA 110 causes the shared memory 140 to store the write command. The CHA 110 causes the cache memory 130 to store the received write data. After causing the cache memory 130 to share the write data, the CHA 110 notifies the host 20 of completion of writing. The DKA 120 reads the write data stored in the cache memory 130, in accordance with the write command stored in the shared memory 140, and causes the disk drive 210 corresponding to a write-target volume 230P to store the write data.

The cache memory 130 is for storing the write data and the like received from, for example, the host 20. The cache memory 130 is constituted by, for example, nonvolatile memory. The shared memory 140 is constituted by, for example, nonvolatile memory. Control information, management information and the like are stored in the cache memory 140.

The shared memory 140 and the cache memory 130 can be provided on the same memory board. Alternatively, a part of each memory can be used as a cache area, and another part can be used as a control area.

The connection controller 150 is to connect each CHA 110, each DKA 120, the cache memory 130 and the shared memory 140. Accordingly, all CHA 110 and DKA 120 can access the cache memory 130 and the shared memory 140. It should be noted that the connection controller 150 can be constituted as, for example, a crossbar switch or the like.

The SVP 160 is connected to each CHA 110 via an internal network CN4 such as a LAN. Also, the SVP 160 can be connected to the management server 30 via a communication network CN2 such as a LAN. The SVP 160 collects various statuses of the storage controller 10 and provides these situations to the management server 30. It should be noted that the SVP 160 may e connected to both the CHA 110 and DKA 120. The SVP 160 can collect various status information items via the shared memory 140, thus it is only necessary to connect the SVP 160 to each CHA 110.

The configuration of the controller 100 is not limited to the above-described configuration. For example, one or a plurality of control boards may be provided with a function for performing data communication with the host 20, a function for performing data communication with the external storage control device 40, a function for performing data communication with disk drives 210, a function for temporarily saving data, and a function for rewritably saving configuration information and the like.

The configuration of the HDU 200 is described. The HDU 200 has a plurality of disk drives 210. Each of the disk drives 210 is realized as, for example, a hard disk drive, flash memory device, optical disk drive, magneto-optical disk drive, holographic memory device, or the like. In other words, the HDU 200 has a rewritable and nonvolatile storage device.

Although varying according to the RAID configuration or the like, for example, a pair of three, four, or predetermined number of disk drives 210 constitute a parity group 220. The parity group 220 is obtained by virtualizing a physical storage area possessed by each of the disk drives 210 within the parity group 220. A logical device (LDEV: Logical Device) 230 of a predetermined size or variable size can be set in each physical storage area possessed by the parity group 220. The logical device 230 is associated with a LUN (Logical Unit Number) and is provided as a logical volume to the host 20. Hereinafter, the logical device 230 is called "logical volume 230" of "volume 230".

As with the storage controller 10, the external storage control device 40 has, for example, a controller 41 and an HDU 42. A logical volume is provided by using one or a plurality of disk drives that the HDU 42 has. Since the external storage device 40 exists outside the storage controller 10 in relation to the storage controller 10, it is called "external storage control device".

The logical volume possessed by the external storage control device 40 is mapped into an intermediate storage device provided virtually in the storage controller 10, and the logical volume 230 is logically set on this intermediate storage device, whereby the storage controller 10 incorporate therein and use the logical volume of the external storage control device 40.

The management server 30 is a device for managing the setting, configuration and the like of the storage controller 10. The user uses the management server 30 to instruct the storage controller 10 to set a volume to be targeted for CDP or to set the targeted protection period. It should be noted that the function of the management server 30 may be provided within the host 20.

Figure 3:
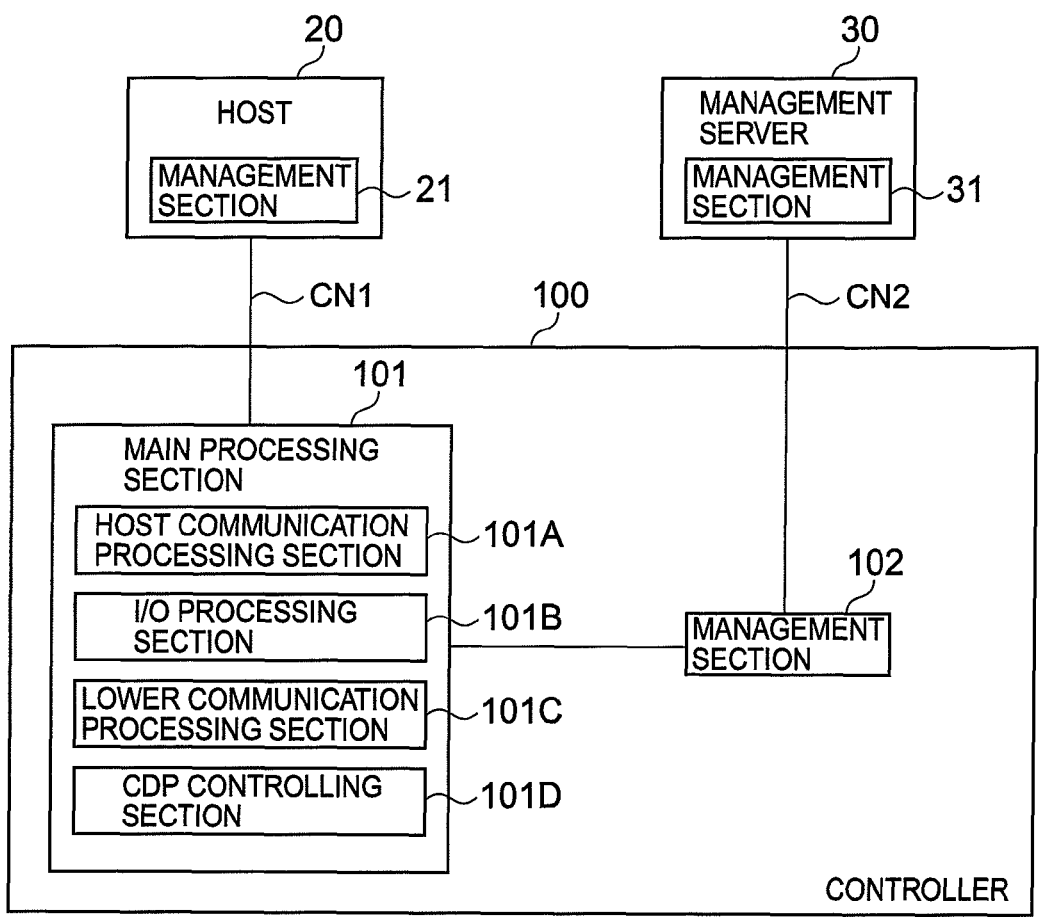

FIG. 3 is an explanatory diagram schematically showing a software configuration. The host 20 can be provided not only with an application program, which is not shown, but also, for example, a management section 21. The management section 21 is a program for performing various settings related to CDP. The management server 30 is also provided with a management section 31 for performing various settings related to CDP. As shown in FIG. 3, both the host 20 and the management server 30 may be configured so as to be able to change settings of the storage controller 10, or one of them may be configured so as to be able to change settings of the storage controller 10.

FIG. 4 is an explanatory diagram schematically showing a logical configuration of the storage controller 10. At least one of the plurality of types of volumes 230P, 230B, and 230J is provided within the storage controller 10. Each of these volumes 230P, 230B and 230J is created by virtualizing the physical storage area of the disk drive 210.

The primary volume 230P is a volume protected by a CDP function. The primary volume 230P is used by the host 20. The base volume 230B is a volume for maintaining the storage contents of the primary volume 230P that are obtained at a predetermined time point in the past. The journal volume 230J is a volume for storing journal data JD that is created when the primary volume 230P is updated.

It should be noted that the journal volume 230J can store a check point marker ("CPM", hereinafter). CPM is a data item that is used by the user or application program to explicitly instruct a restorable point in advance. Therefore, the user or application program can specify a restoration point by using either a time or CPM. It should be noted that even when managing both CPM and journal dada JD together, the CPM can be searched promptly by storing a journal sequence number set to the CPM. It should noted that the set CPM can be deleted. For example, if there is an upper limit on the number of CPMs that can be set, specified CPMS are deleted.

In the present embodiment, one or a plurality of volumes 230P can be protected as the target of CDP. Specifically, only one volume 230P can be protected independently, or a plurality of volumes 230P can be grouped and protected entirely as a group. For example, a plurality of volumes 230P that store data items that are associated one another can be grouped, and protection operations of CDP can be synchronized.

The base volume 230B is associated with the primary volume 230P one-on-one. On the other hand, one journal volume 230J can be associated with each of the plurality of primary volumes 230P.

The storage controller 10 has a plurality of difference bitmaps BM10 through BM30. The difference bitmap BM10 for differential copying is used when differential-copying data from the base volume 230B to the primary volume 230P at the time of restoration. The BM10 can also be called "restoration copying difference bitmap". It should be noted that the BM10 for differential copying can also be used when copying difference data from the primary volume 230P to the base volume 230B. Furthermore, the difference bitmap for initial copy, which is used when copying data from the primary volume 230P to the base volume 230B, and the difference bitmap for restoration copy, which is used when copying data from the base volume 230B to the primary volume 230P, can be prepared separately.

The sectional difference bitmap BM20 manages the position of difference generated between the primary volume 230P and the base volume 230B, for each section that is set beforehand. A time zone that is used by the sectional difference bitmap BM20 (e.g., a range of the journal sequence number) is managed as an attribute of the sectional difference bitmap BM20. The difference bitmap BM30 that is used during recovery is used for managing a difference generated during recovery. Even during recovery, there is a case in which the host 20 issues a write request, thus the difference between the primary volume 230P and the base volume 230B that is generated by the write request is stored by the difference bitmap BM30. The difference bitmap BM30 can also be called "recovering difference bitmap". It should be noted that a difference bitmap to be used while CDP is stopped can be provided.

Figure 5:
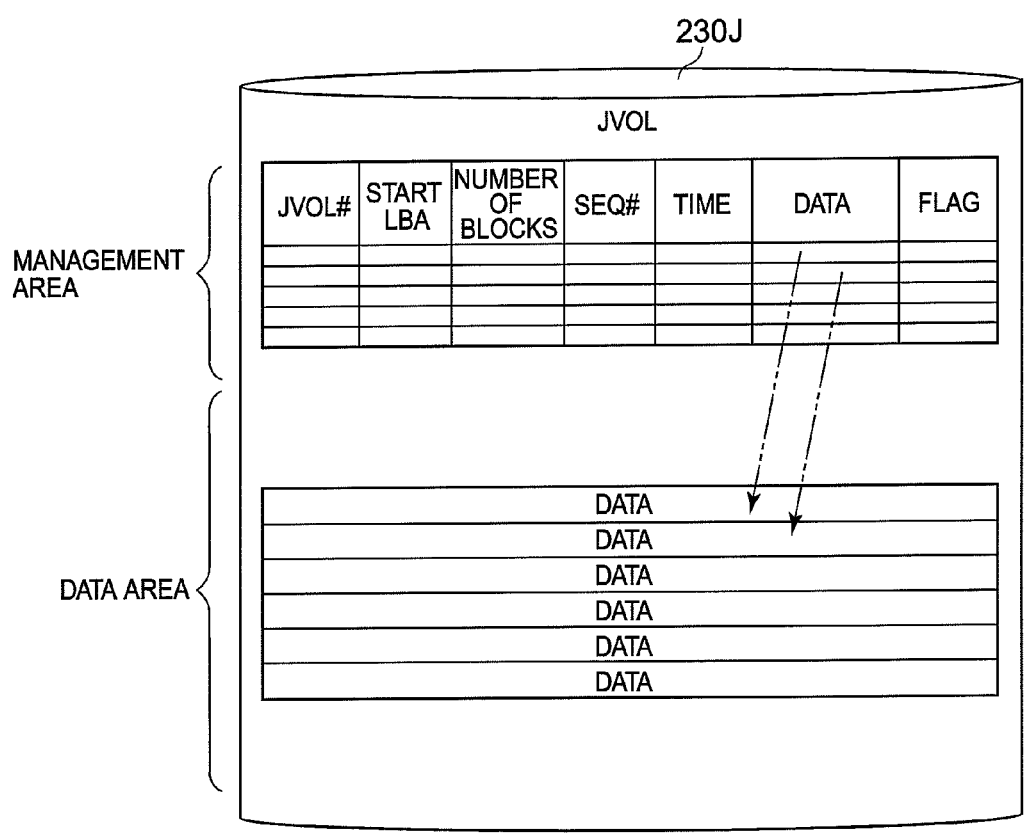
FIG. 5 is an explanatory diagram showing a general outline of a configuration of journal data.

FIG. 5 is an explanatory diagram schematically showing a storage configuration of the journal volume 230J. The storage area of the journal volume 230J is roughly divided into a management area and a data area. The management area sores data or CPM for managing the journal data JD. The data area stores the data itself of the journal data JD.

A label can be set in the CPM. The label is a data item specified by the user when setting the CPM. For example, the user can provide the CPM with a character string containing an application name or host time as the label. The label provided on the CPM can be stored in the journal data JD.

The examples of management data (metadata) include a volume number ("VOL #" in the figure), a start LBA, the number of blocks, a sequence number ("SEQ #" in the figure), time, data, flag, and the like.

"Volume number" is an information item for specifying the primary volume 230P. "Start LBA" is a logical block address that shows the beginning of write data written into the primary volume 230P. "The number of blocks" is an information item indicating the size of the write data. "Sequence number" is an identification number that is set sequentially in the journal data JD. "Time" is the time at which a write request is issued. "Data" is a pointer indicating the position of the data itself. "Flag" is a control information item for showing whether the journal data JD is to be treated as enabled data or nullified data. It should be noted that, in place of the flag for indicating enable or nullified journal data, for example, a method of separately managing a sequence number of the nullified journal data may be used. In this case, it is not necessary to rewrite the management data within the management area (metadata), thus the processing load can be reduced.

The journal data JD in which the value of the flag is set to an enabled value is written to the base volume 230B after a lapse of the targeted protection period. The journal data JD in which the value of the flag is set to a nullified value is not written to the base volume 230B even after a lapse of the targeted protection period. Specifically, the nullified journal data JD is not the target of reflection processing.

The reflection processing is for writing the journal data to a volume and updating the storage contents of the volume.

It should be noted that the CPM can be managed along with the management data managing the journal data JD, or can be managed in a different table.

Figure 6:
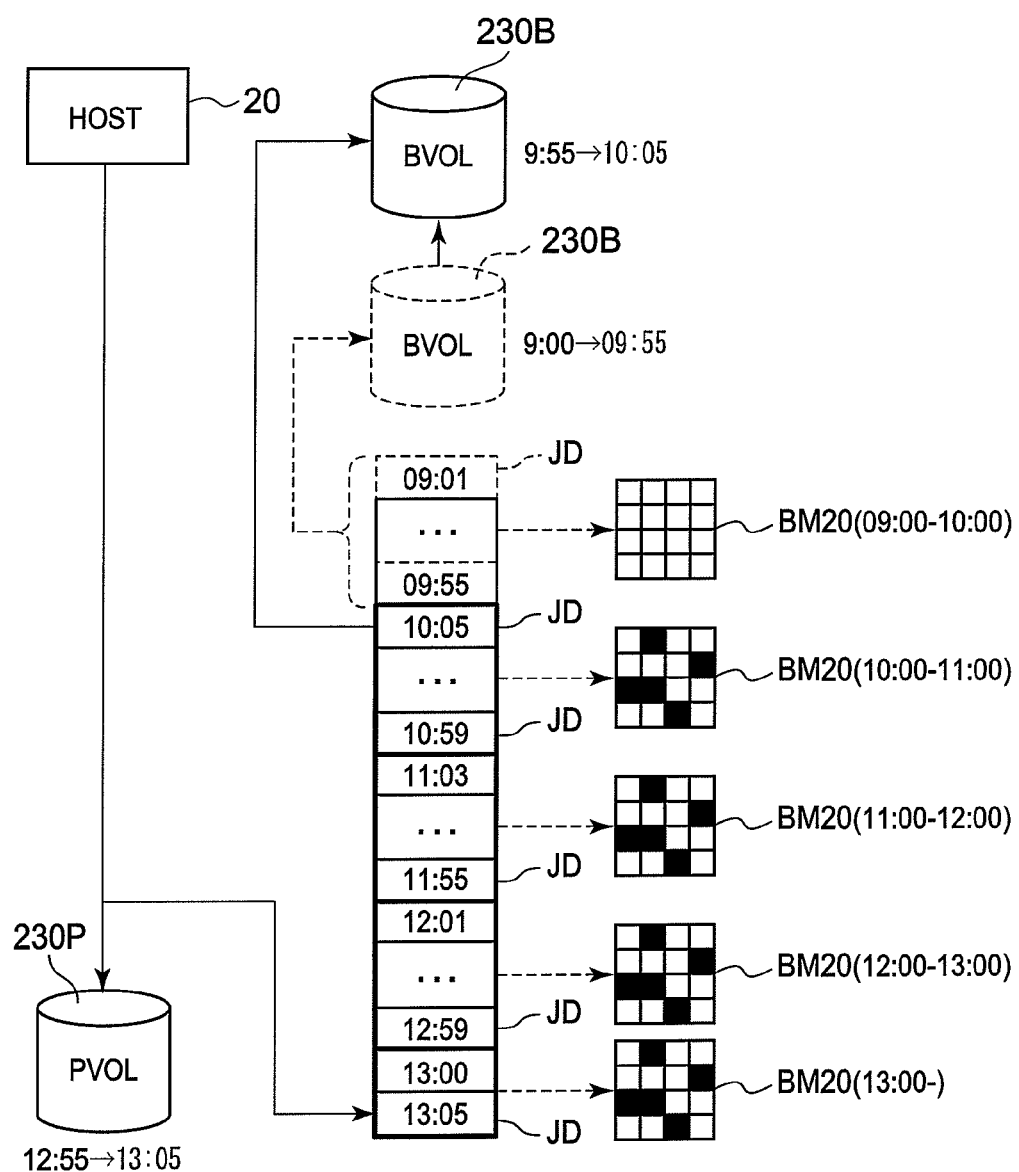
FIG. 6 is an explanatory diagram showing a situation in which a difference bitmap is switched in each section to manage the difference.

FIG. 6 is an explanatory diagram showing a method for using the sectional difference bitmap BM20. For example, one difference bitmap BM20 is used for each predetermined section, such as "one hour", that is set in advance.

In the example shown in FIG. 6, a BM20 (09:00-10:00) is used in a section of "9:00-10:00", a BM20 (10:00-11:00) is used in a section of "10:00-11:00", a BM20 (11:00-12:00) is used in a section of "11:00-12:00", a BM20 (12:00-13:00) is used in a section of "12:00-13:00", and a BM20 (13:00-) is used in a section of "13:00-".

When the targeted protection period is set to "three hours", the journal data JD after a lapse of three hours from a current time is written to the base volume 230B. The journal data JD written to the base volume 230B is discarded. It should be noted that the present embodiment describes the case in which the reflection processing is performed in accordance with elapsed time, but the reflection processing can be performed in accordance with, for example, the usage rate of the journal volume 230J.

When all journal data JD (09:01-09:55) managed in the difference bitmap BM20 (9:00-10:00) are written to the base volume 230B and discarded, this difference bitmap BM20 (9:00-10:00) is not required. This unnecessary difference bitmap BM20 is sometimes called "empty bitmap". Therefore, the storage contents of the difference bitmap BM20 (09:00-10:00) are deleted, and this difference bitmap is reused as another difference bitmap BM20 for managing another new section (14:00-15:00).

It should be noted that the targeted protection period TPT can be changed during the normal operation. For example, when the targeted protection period is extended during the normal operation, the reflection processing is stopped until the journal data JD for the extended time period is accumulated in the journal volume 230J. During a period in which the reflection processing is stopped, the empty bitmap (the difference bitmap BM20 in which all journal data managed by the bitmap is subjected to the reflection processing) is not generated. Also, by extending the targeted protection period, the timing for switching the sectional difference bitmap BM20 is changed.

As a first method, there is a method of continuing to use the sectional difference bitmap BM20 that is presently used, until the empty bitmap is generated.

As a second method, there is a method of selecting two oldest sectional difference bitmaps BM20, merging the selected sectional difference bitmaps BM20 to form one sectional difference bitmap BM20, and thereby generating one empty bitmap.

As a third method, there is a method of obtaining an empty bitmap by collecting a predetermined number of sectional difference bitmaps BM20 to form one difference bitmap BM20 in accordance with how much the targeted protection period TPT is extended. For example, when the targeted protection period TPT doubles (TPT=2×TPT), sectional difference bitmaps BM20 each having two faces are merged to form one difference bitmap, and when the targeted protection period TPT triples (TPT=3×TPT), sectional difference bitmaps BM20 each having three faces are merge to form one difference bitmap. When the targeted protection period TPT becomes 1.5 times larger (TPT=1.5×TPT), the sectional difference bitmaps BM20 each having two surfaces out of the sectional difference bitmaps BM20 each having three surfaces are merged to form one difference bitmap, and the remaining sectional difference bitmap BM20 is remained as it is.

Here, it is preferred that the number of sectional difference bitmaps BM20 to be prepared be larger by two than the number of sections. Specifically, when managing the difference in n sections, the total number of difference bitmaps BM20 is preferably set to n+2. Some processing time periods are required in order to delete and reuse the reason that the oldest difference bitmaps BM20. In order to securely mange a write request issued at the switching timing of the difference bitmaps BM20, the number of difference bitmaps BM20 to be prepared is preferably larger by two than the number of sections.

As shown by the dashed lines in FIG. 6, the journal data JD (09:01-09:55) within a section managed by the difference map BM20 (09:00-10:00) is written entirely into the base volume 230B. Accordingly, the storage contents of the base volume 230B match the storage contents of the primary volume 230P at the time of "09:55". Thereafter, the time passes and becomes "13:05", the journal data JD existing until "10:05", which is three hours before "13:05", is written into the base volume 230B. Accordingly, the storage contents of the base volume 230B match the storage contents of the primary volume 230P at "10:05".

In this manner, the storage contents of the base volume 230B can be caused to follow the corresponding storage contents of the primary volume 230P the targeted protection period later. Specifically, the time of the storage contents shown by the base volume 230B (this time is called "base point") is shifted as the actual time advances. The base point indicates a starting point of a period in which the storage contents of the primary volume 230P can be restored. The CDP function is not sufficient to trace back to the past from the base point to restore the storage contents of the primary volume 230P. It should be noted that when writing the journal data JD into the base volume 230B is stopped, shifting of the base point is also stopped.

Figure 7:
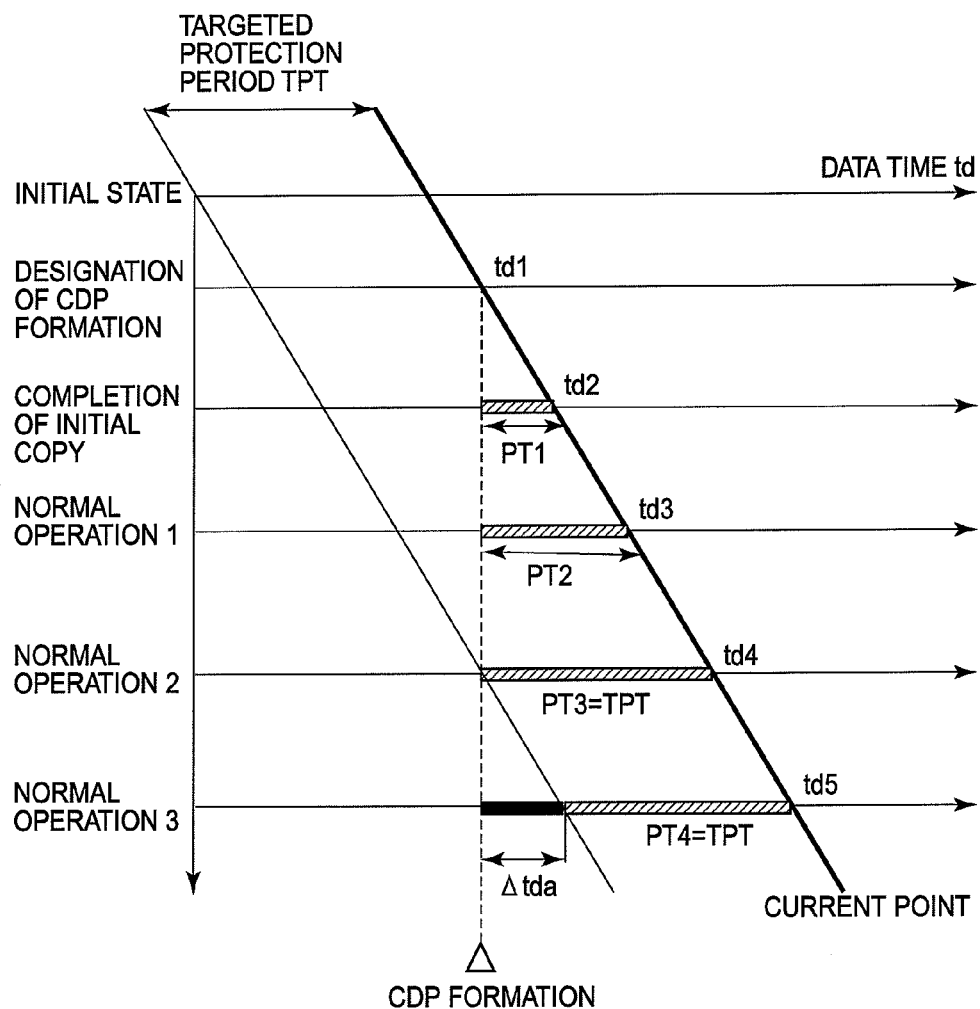
FIG. 7 is an explanatory diagram showing changes in a protection period in a normal operation state.
Figure 8:
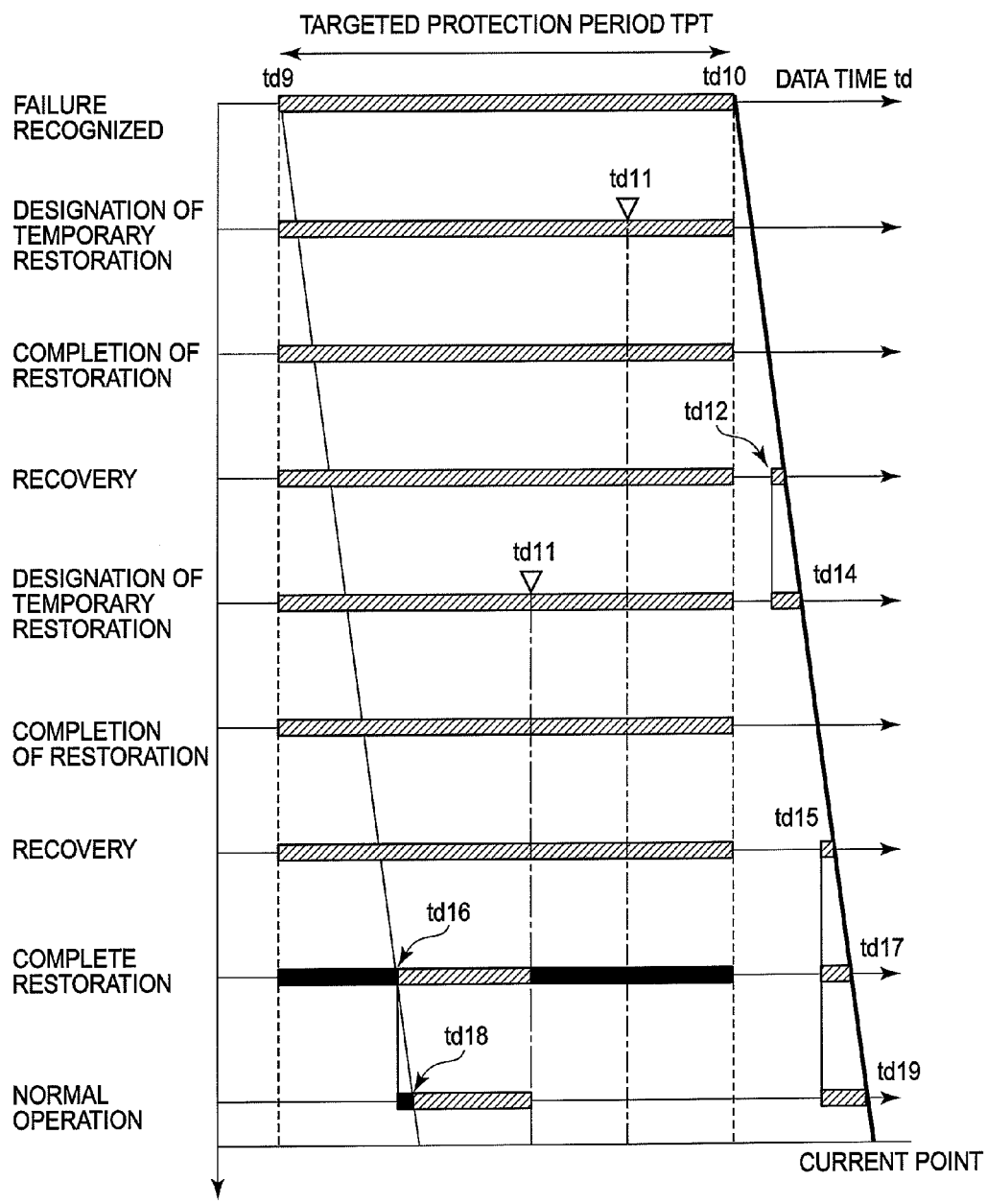
FIG. 8 is an explanatory diagram showing changes in the protection period during recovery.

Changes of a period in which storage contents are protected by means of CDP are described with reference to FIG. 7 and FIG. 8. FIG. 7 is an explanatory diagram showing changes in the protection period between start of protection by means of CDP and a point at which the status of the storage controller 10 is shifted to the normal operation state. In FIG. 7 and FIG. 8, the shaded areas indicate a state in which the journal data JD is accumulated, and the blackened part indicates deleted journal data JD. Specifically, the shaded areas in each figure indicate the protection period PT in which the storage contents can be restored by means of the journal data JD.

FIG. 7 is referenced. In the initial state, both the primary volume 230P and the base volume 230B are not set, and the storage contents are not protected by means of CDP. When an instruction for CDP creation is provided, both the primary volume 230P and the base volume 230B are set, and then initial copy for copying the storage contents of the primary volume 230P obtained at time td1 to the base volume 230B is started, the td1 being time at which CDP creation is specified.

The host 20 can issue a write request targeting the primary volume 230P, during the initial copy. As described above, in the case in which a write request is issued for an uncopied area where copying from the primary volume 230P to the base volume 230B is not completed, for example, a method is used in which the data stored in the uncopied area is copied to the base volume 230B, and thereafter the write request is accepted. The storage controller 10 creates journal data JD on the basis of the write request, and causes the journal volume 230J to store the created journal data therein. At a initial copy completing time td2, the journal data JD related to the write request issued between the CDP creation time td1 and the initial copy completion time td2 is stored in the journal volume 230J. Therefore, a protection period PT1 is a period between td1 and td2. The protection period PT1 has not yet reached the targeted protection period TPT.

After completion of initial copy, the status of the storage controller 10 is shifted to the normal operation state 1. Here, in order to clearly show a time variation in the normal operation state in FIG. 7, reference numerals are added, such as "normal operation 1", "normal operation 2", and "normal operation 3", according to the passage of time.

In normal operation 1, the journal data JD related to a write request issued between td1 and td3 is stored in the journal volume 230J. In this case, a protection period PT2 is a period between td1 and td3. The protection period PT2 has not yet reached the targeted protection period TPT.

In normal operation 2, the journal data JD related to a write request issued between td1 and td4 is stored in the journal volume 230J. In this case, a protection period PT3 is a period between td1 and td4. The protection period PT3 has reached the targeted protection period TPT.

In normal operation 3 after a lapse of time, the journal data JD after a lapse of the targeted protection period TPT are written to the base volume 230B and then discarded. Specifically, the journal data JD accumulated during a period, which is earlier than the latest data time td5 by the targeted protection period TPT ($\Delta tda=(td5-TPT)-td1$), are sequentially written to the base volume 230B. The journal data JD written to the base volume 230B are discarded. Since the journal data items JD obtained during the targeted protection period TPT are accumulated in the journal volume 230J, the user or application program can specify any time point within the period of time, which is earlier than the current time td5 by the targeted protection period TPT, as the restoration point.

FIG. 8 shows a state in which the protection period is divided after complete restoration. As shown at the top of FIG. 8, suppose that some kind of a failure occurs in the normal operation state and that the occurrence of the failure is recognized by the user or application program.

The journal data JD related to a write request issued during a period between the oldest time td9 and the latest time td11 are stored in the journal volume 230J. When the occurrence of the failure is recognized, acceptance of an access request sent from the host 20 to the primary volume 230P is stopped, and the processing for writing the journal data JD to the base volume 230B is also stopped, prior to the execution of temporary restoration.

It should be noted that, regardless of whether temporary restoration is executed or not, only the processing for writing the journal data JD to the base volume 230B can be stopped. For example, it is preferred that the reflection processing be stopped prior to the execution of failure investigation. This is because if the reflection processing is not stopped, the protection period is reduced while investigating the failure. Therefore, it is desired that the reflection processing be stopped to prevent the protection period from being reduced, before starting the failure investigation. However, for example, in the case in which the targeted protection period is set sufficiently long, it is not necessary to stop the reflection processing before starting the failure investigation.

At the time td11 as the restoration point, execution of temporary restoration is instructed. The sectional difference bitmaps BM20 are merged to form a difference bitmap BM10 for differential copy, and this difference bitmap BM10 is used to differentially copy the data from the base volume 230B to the primary volume 230P. Thereafter, the journal data JD of the period between the oldest time td9 and the restoration point td11 are sequentially written to the base volume 230B, whereby temporary restoration is completed.

Temporary restoration is completed at time td12, and a command or data for confirming the recovered storage contents is issued from the host 20. The storage controller 10 creates journal data JD related to the write data that is issued from the host 20 after completion of temporary restoration, and causes the journal volume 230J to store the created journal data.

The user or application program, which is not satisfied with the recovered contents obtained after temporary restoration at the time of the restoration point td11, instructs execution of the second temporary restoration at another time td13 as the restoration point. When the second temporary restoration is instructed at time td14, the journal data JD that are accumulated after the first temporary restoration (journal data JD within a period of td12-td14) are discarded.

Once the second temporary restoration is completed, the user or application program confirms the recovered storage contents. After time td15 subsequent to the time of recovery, journal data JD are created in relation to write data issued from the host 20, and then stored in the journal volume 230J.

When the user or application program satisfies with the result of the second temporary restoration, at the time td 17 execution of complete restoration is instructed. By instructing the execution of complete restoration, the storage contents of the primary volume 230P are determined to be the storage contents obtained at the restoration point td13. The storage controller 10 discards all successive journal data JD accumulated after the restoration point td13 at which the storage contents are determined. Specifically, in the example shown in the figure, all journal data JD obtained in a period between td13 and td10 are discarded.

The storage controller 10 writes the journal data JD, which are accumulated before time td16 that is earlier than the current time td17 by the targeted protection period TPT, to the base volume 230B sequentially, and discards the journal data JD. Specifically, the journal data JD that are obtained in a period other than the targeted protection period TPT (a period of td16-td10) are discarded after being subjected to the reflection processing.

Normal operation is started after completion of the complete restoration. In the normal operation, the journal data JD related to the write requests issued after td15 are accumulated in the journal volume 230J. On the other hand, the journal data JD after a lapse of the targeted protection period TPT (td18-td16) are written to the base volume 230B sequentially and then discarded.

The point to be focused here is that the protection period PT in which storage contents are protected by means of CDP is divided into two by executing complete restoration. The protection period PT is divided into a first period (td16-td13) which is an older period, and a second period (td15-td17) which is a newer period.

A configuration is possible in which the journal data JD obtained before the restoration point td13 (journal data JD in a period of td16-td13) are immediately written to the base volume 230B and then discarded after completion of complete restoration. Specifically, the reflection processing can be immediately performed on the journal data JD within the first period (td16-td13), and the base point can be shifted from td16 to td13.

However, as in the present embodiment, by holding the journal data JD obtained before the restoration point td13 of complete restoration, the user can instruct recovery of the journal data to the time before the td13 even after completion of complete restoration, whereby the usability for the user improves.

When a plurality of primary volumes 230P are grouped as a CDP group, the storage contents can be recovered by means of either of the two methods. The first method is a method for carrying out restoration control in units of groups. In the first method, all of the primary volumes 230P within the CDP group are synchronously controlled so as to match all protection period PT match.

In the first method, all of the primary volumes 230P within the CDP group are recovered to the storage contents of the same time, and the reflection processing of the journal data JD is stopped and restarted simultaneously. In the case of the first method, the protection period PT of the all primary volumes 230P within the CDP group is shifted as described with reference to FIG. 13.

The second method is a method for carrying out restoration control in units of volumes. In the second method, each of the primary volumes 230P within the CDP group can be subjected to temporary restoration and complete restoration. It should be noted that a plurality of primary volumes 230P within the CDP group can be subjected to restoration control in units of volumes.

The processing that is performed when a physical failure occurs in the primary volume 230P is described. In this case, first, a failed disk drive 210 is replaced with a normal disk drive 210. Then, in a first temporary restoration performed after replacing the disk drive, all data are copied from the base volume 230B to the primary volume 230P, and the journal data JD are written to the primary volume 230P. From the second temporary restoration on, as described above, a plurality of sectional difference bitmaps BM20 are merged to create the difference bitmap BM10 for differential copy, and this difference bitmap BM10 is used to perform differential copy, whereby the temporary restoration is executed.

It should be noted that the storage contents can be restored to a volume different from the primary volume 230P. For example, in the first temporary restoration, after all data of the base volume 230B are copied to another volume, the journal data JD are written to this volume. In the second temporary restoration, as described above, the sectional difference bitmaps BM20 are merged, and thus obtained difference bitmap BM10 for differential copy is used to perform differential copy, whereby the temporary restoration is executed.

In the case in which the CDP group is constituted by a plurality of primary volumes 230P having different protection periods respectively, restoration can be managed using several methods. For example, in the first method, restoration can be performed only at a point of time at which the protection periods of the primary volumes 230P within the CDP group are overlapped. In the second method, only the primary volume 230P having a protection period containing a designated restoration point is restored. In the third method, only the primary volume 230P having a protection period containing a designated restoration point is restored to the designated restoration point, and each of other restoration volumes 230P having a protection period that does not contain the designated restoration point is restored to the time point that is most proximate to the designated restoration point within the protection period.

Figure 9:
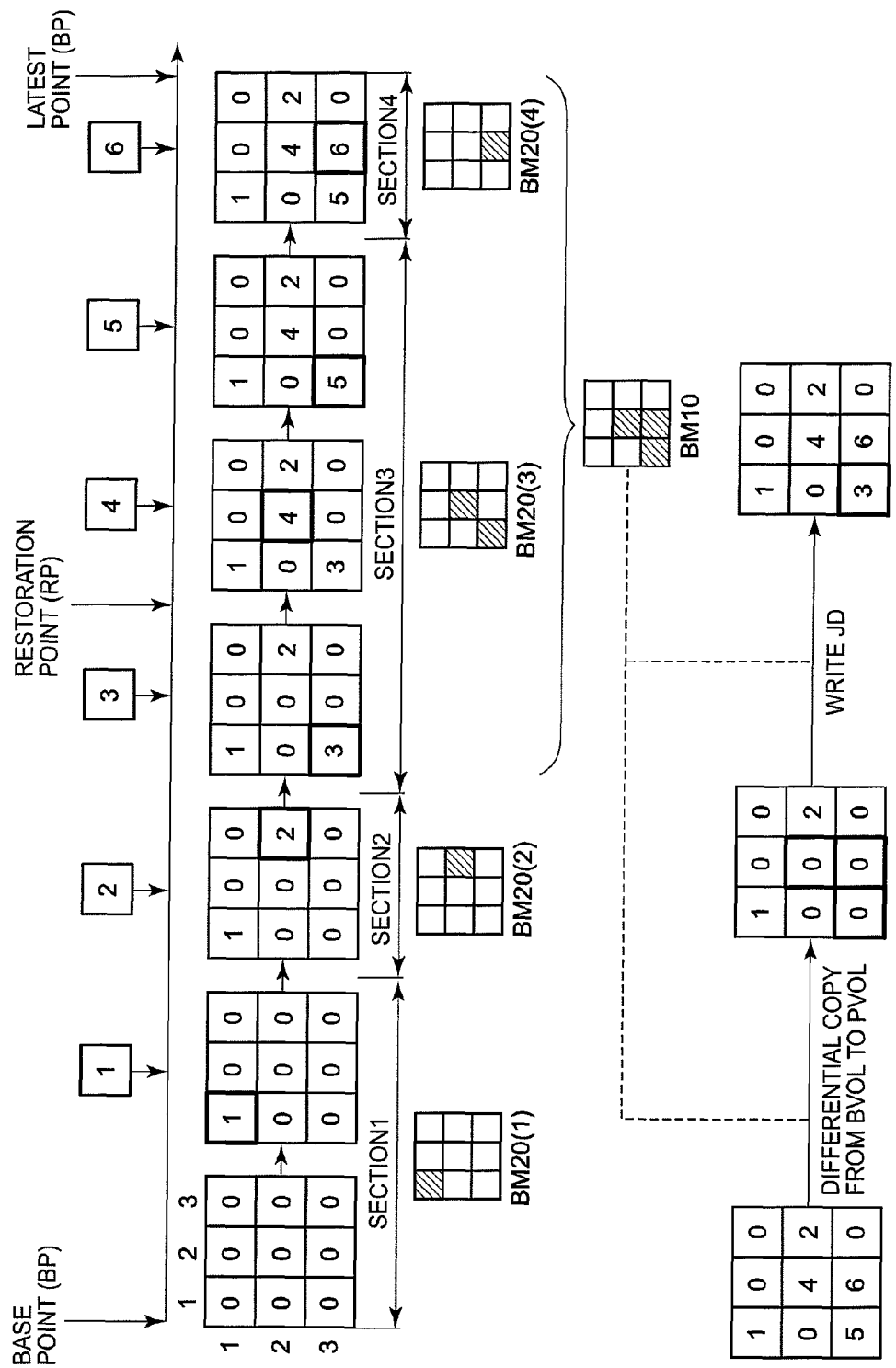
FIG. 9 is an explanatory diagram showing a general outline of a restoration processing.

A general outline of the restoration processing is described with reference to FIG. 9. FIG. 9 shows a state in which the storage contents of the primary volume 230P change from a state at the base point to a state at the latest point as time advances. In FIG. 9, all periods between the base point BP and the latest point LP are divided into four sections of section 1 through section 4, and managed.

Differences (updated positions) that are generated in the primary volumes 230P in the first section 1, the second section 2, the third section 3, and the fourth section 4 respectively are managed by, respectively, a sectional difference bitmap BM20 (1), a sectional difference bitmap BM20 (2), a sectional difference bitmap BM20 (3), a sectional difference bitmap BM20 (4).

An updated position related to writing of data "1" is recorded in the sectional difference bitmap BM20 (1) managing the section 1. An updated position related to writing of data "2" is recorded in the sectional difference bitmap BM20 (2) managing the section 2. Updated positions related to writing of data "3", "4" and "5" are recorded in the sectional difference bitmap BM20 (3) managing the section 3. An updated position related to writing of data "6" is recorded in the sectional difference bitmap BM20 (4) managing the section 4.

In the case in which a time point at which the data "3" is written to the primary volume 230P is designated as the restoration point, the storage controller 10 obtains a logical sum of the sectional difference bitmaps BM20 (3) and BM20 (4) to create the difference bitmap BM10 that indicates the difference subsequent to the restoration point. The shaded areas in the bitmaps each indicates a position having an update, and the blank areas each shows a position having no update.

The storage controller 10 differentially copies the data of an area that is updated within a period between the restoration point and the latest point, from the base volume 230B to the primary volume 230P on the basis of the difference bitmap BM10. The storage controller 10 detects the overlapping section (1, 3) before and after the restoration point, and overwrites the journal data obtained from the base point through the restoration point in a predetermined order, for an area updated before and after the restoration point. For the blank areas of the difference bitmap BM10, i.e., the areas in which the data are not updated during a period between the restoration point and the latest point, the data of the primary volumes 230P are used as they are.

Specifically, for the areas in which the data are not updated before and after the restoration point, the data of the primary volumes 230P are used. For each area in which the data is updated both before and after the restoration point, the data is copied from the base volume 230B to the primary volume 230P, and thereafter the journal data obtained during a period between the base point and the restoration point is applied to the primary volume 230P. Moreover, for the area in which the data is not updated after the restoration point, the data of the primary volume 230P is used. For the areas in which the data are not updated before the restoration point, the data is copied from the base volume 230B to the primary volume 230P.

It should be noted that the above-described restoration processing is an example, and the present invention can be realized using the following various methods described hereinafter.

The operation of the storage controller 10 is described with reference to the flowcharts of FIG. 10 through FIG. 12. Each of the flowchart described below shows a general outline of the processing, which is sometimes different from an actual computer program. Also, those skilled in the art can probably change the steps shown in each flowchart to different steps or delete those steps.

Figure 10:
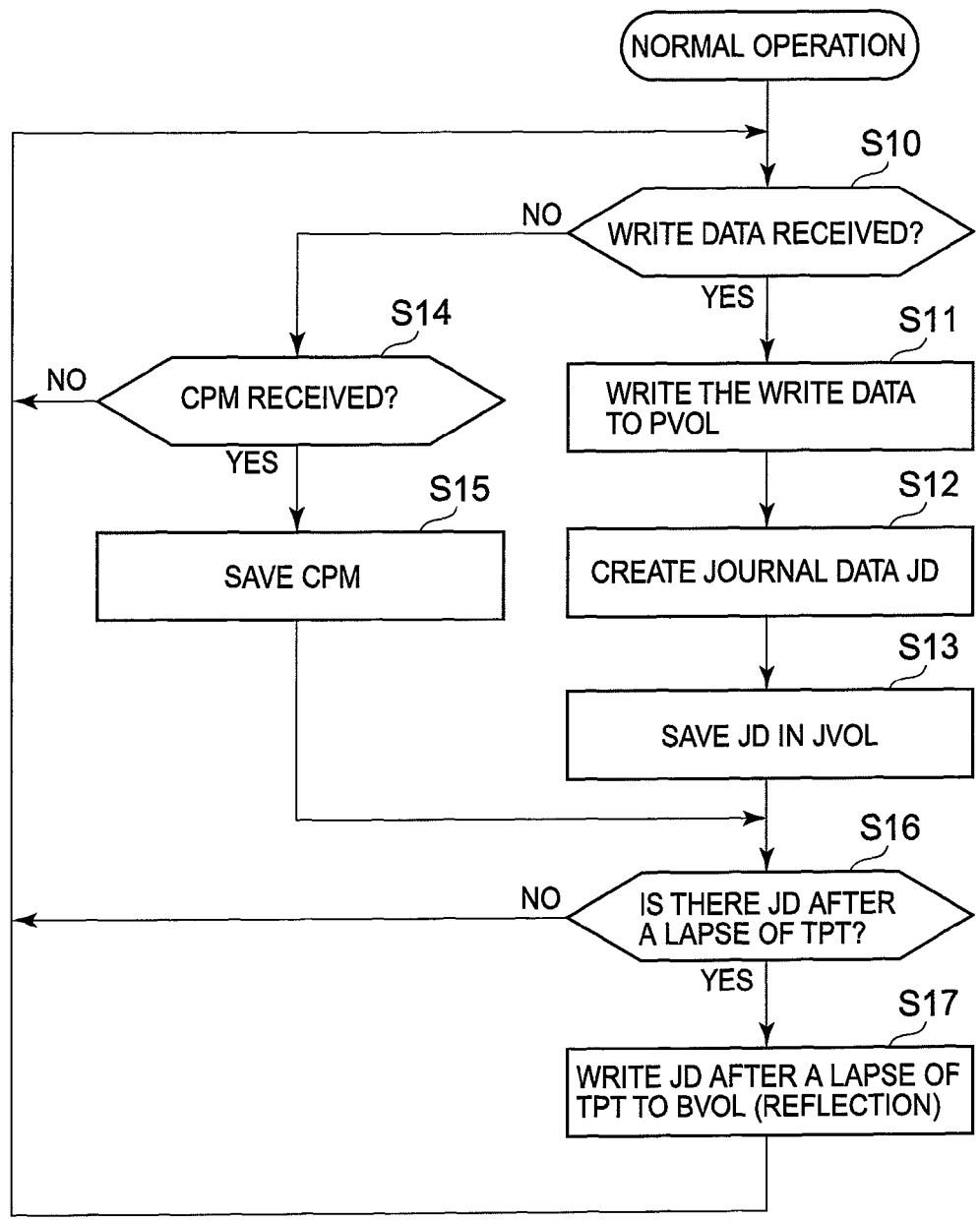
FIG. 10 is a flowchart showing a normal operation processing.

FIG. 10 is a flowchart showing processing performed in the normal operation. Once the storage controller 10 receives write data from the host 20 (S10: YES), the storage controller 10 writes the write data to the primary volume 230P (S11).

The storage controller 10 creates journal data JD related to the received write data (S12), and causes the journal volume 230J to store the journal data JD (S13). On the other hand, when the CPM is received from the host 20 (S10: NO, S14: YES), the storage controller 10 causes the journal volume 230J to store this CPM (S15).

The storage controller 10 compares the time information set in each journal data item JD stored in the journal volume 230J, with current time, and thereby determines whether there exists a journal data item JD that is still obtained even after the targeted protection period TPT, i.e., whether there exists a journal data item JD that is not in the targeted protection period TPT (S16).

If there exists a journal data item JD that is not in the targeted protection period TPT (S16: YES), the storage controller 10 writes the journal data item JD that is not in the targeted protection period TPT, to the base volume 230B, and discards it after writing it (S17).

Figure 11:
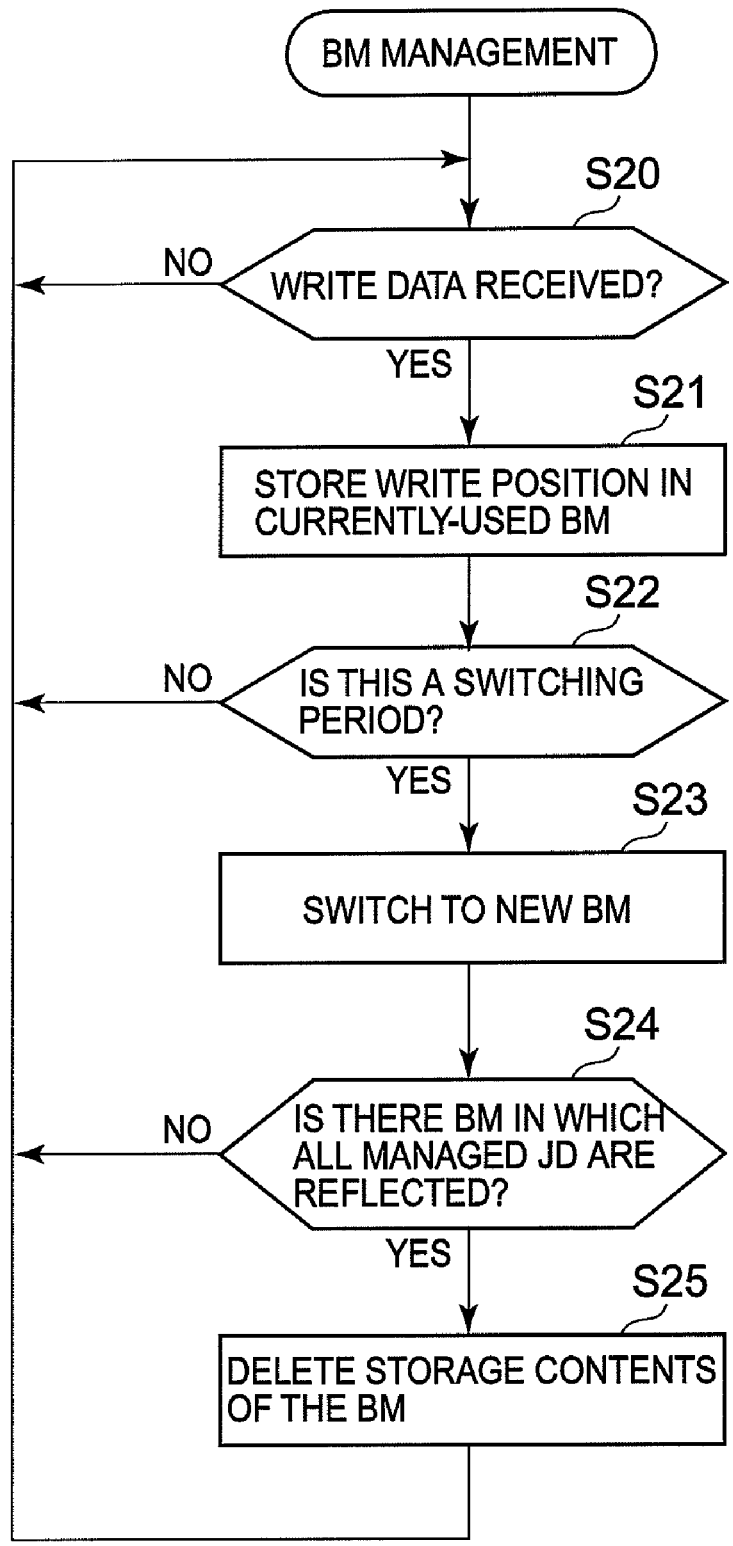
FIG. 11 is a flowchart showing processing for switching a bitmap in each section and using thus obtained bitmaps.

FIG. 11 is a flowchart showing processing that is used while switching the sectional difference bitmaps BM20. The storage controller 10 determines whether write data is received from the host 20 (S20). Specifically, the storage controller 10 monitors whether a write request is issued from the host 20 (S20).

When write data is received (S20: YES), the storage controller 10 causes the difference bitmap BM20 that is currently used to store the position for writing the write data (S21). Specifically, the storage controller 10 sets "1" for the difference bit corresponding to a slot updated by the write data.

The storage controller 10 determines whether a time period for switching the difference bitmaps BM20 has arrived or not (S22). For example, if a section is defined as a predetermined time, the storage controller 10 determines whether the predetermined time has elapsed. On the other hand, if the section is defined by usability of the journal volume 230J, i.e., UJ, the storage controller 10 determines whether the predetermined usability has been reached or not.

When it is determined that the switching time period has arrived (S22: YES), the storage controller 10 switches the current difference bitmap to the next difference bitmap BM20, and manages the update of the primary volume 230P that is made by the host 20 (S23).

The storage controller 10 determines whether there exists, out of the used difference bitmaps BM20, a difference bitmap BM20 in which journal data items JD managed by each of the used difference bitmaps are entirely written to the base volume 230B (S24). Specifically, the storage controller 10 determines whether there exists a used difference bitmap BM20 in which the reflection processing is completed on all journal data items JD associated with the used difference bitmaps BM20 (S24).

If there is detected the used difference bitmap BM20 in which corresponding all journal data items JD are written to the base volume 230B and discarded is detected (S24: YES), the storage controller 10 deletes the storage contents of this used difference bitmap BM 20 (S25), and uses this difference bitmap BM20 in difference management in the next section.

Figure 12:
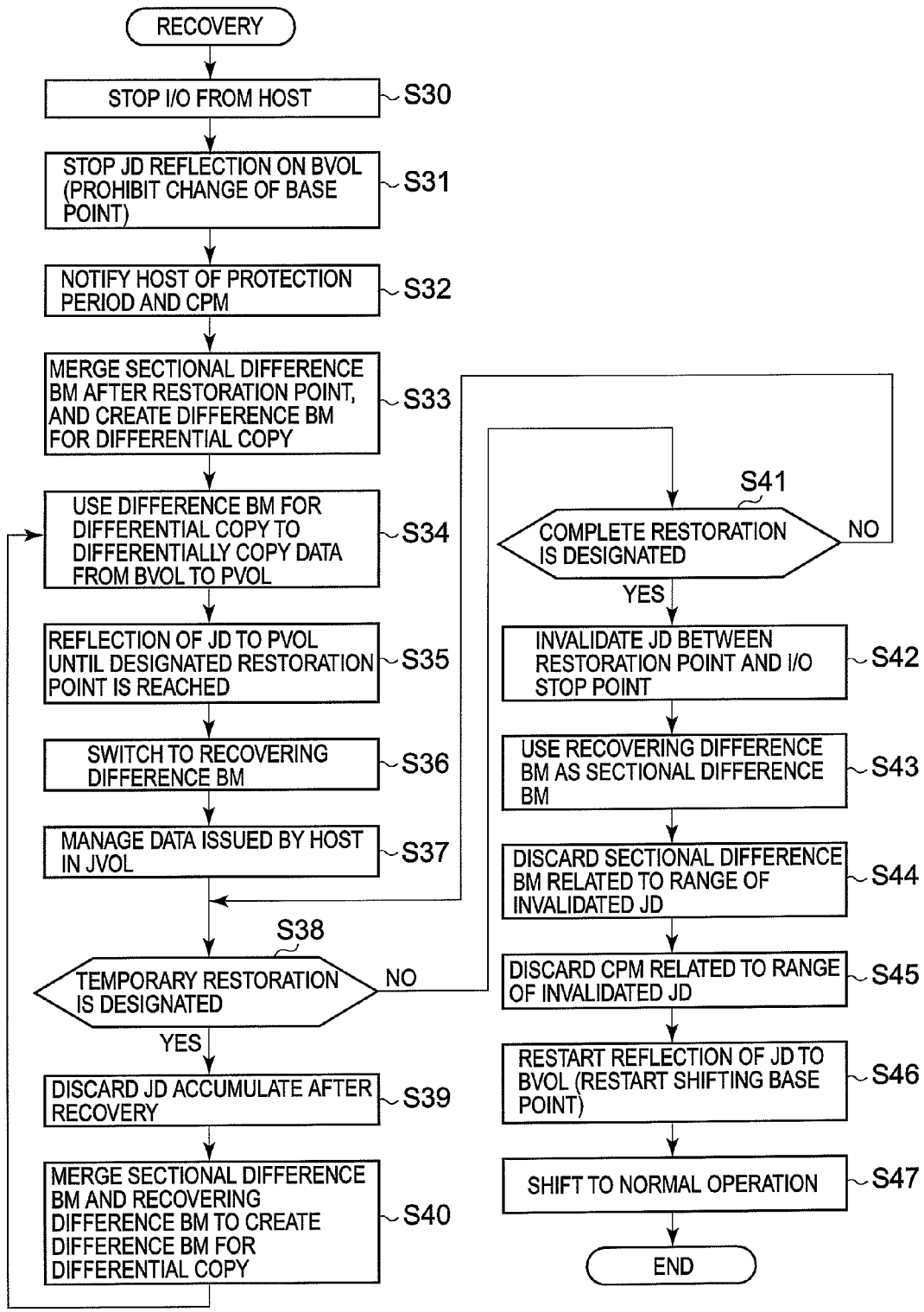
FIG. 12 is a flowchart showing a recovery processing.

FIG. 12 is a flowchart showing a recovery processing. Prior to execution of temporary restoration, access from the host 20 to the primary volume 230P is prohibited (S30). Prohibition of access from the host access can be performed by the user or application program. Alternatively, the storage controller 10 can prohibit acceptance of an access request issued from the host 20.

The storage controller 10 stops processing of writing the journal data JD that is not in the targeted protection period TPT to the base volume 230B and discarding the journal data (reflection processing) (S31). Accordingly, the base point indicated by the base volume 230B is fixed, whereby shifting is stopped.

The storage controller 10 notifies the host 20 of a selectable protection period PT and a CPM that is already set (S32). The host 20 selects the restoration point to perform temporary restoration, on the basis of the reported information.

It should be noted that the management server 30 can be sued in place of the host 20. Specifically, the storage controller 10 can notify the management server 30 of the protection period PT and set CPM, and the management server 30 can provide the storage controller 10 with an instruction for execution of restoration.

The storage controller 10 merges the sectional difference bitmaps BM20 obtained after the restoration point, and thereby creates the difference bitmap BM10 for differential copy (S33). Specifically, the storage controller 10 obtains a logical sum of the sectional difference bitmaps BM20 (including the sectional difference bitmap BM20 containing the bitmap of the restoration point) obtained after the restoration point, and thereby creates the difference bitmap BM10 for differential copy. It should be noted that the section covering the restoration point may be configured so as to obtain an accurate difference bitmap by using the management data of journal data JD. An example of creating an accurate difference bitmap on the basis of the journal management information is described with reference to FIG. 24.

The storage controller 10 uses the difference bitmap BM10 to copy the data from the base volume 230B to the primary volume 230P (s34). For the areas that are updated before and after the restoration point, respectively, the storage controller 10 sequentially reads from the oldest journal data to the journal data of the restoration point out of the journal data JD that are stored in the journal volume 230J, and writes the read journal data into the primary volume 230P (S35).

The storage controller 10 changes the difference bitmap BM10 for differential copy to the recovering difference bitmap BM30 (S36). When the prohibition of access from the host 20 to the primary volume 230P is removed, the position at which the primary volume 230P is updated by the host 20 is managed by the difference bitmap BM30. Furthermore, the storage controller 10 creates journal data JD related to the write request issued from the host 20, and causes the journal volume 230J to store the created journal data (S37).

When the execution of temporary restoration is instructed again (S38: YES), the storage controller 10 discards the journal data JD accumulated after the first recovery (S39). The storage controller 10 then merges the sectional difference bitmaps BM20 obtained after the restoration point and the recovering difference bitmap BM30 to create the difference bitmap BM10 for differential copy again (S40). The user or application program can repeatedly execute the steps S34 through S40 until the user or application program satisfies the storage contents restored by means of temporary restoration.

When executing temporary restoration again, the number of sectional difference bitmaps BM20 to be merged can be reduced. Here, the previous restoration point is taken as RP1, and the restoration point for performing temporary restoration again is taken as RP2.

(1) When RP2 is newer than RP1 (RP2>RP1), for the area in the recovering difference bitmap in which a difference bit is ON, the data is copied from the base volume 230B to the primary volume 230P, and the journal data including the journal data of RP2 is applied to the primary volume 230P.

For the other areas, the journal data from RP1 to RP2 are applied to the primary volume 230P.

(2) When RP2 is older than RP1 (RP2<RP1), first, a difference bitmap for managing the difference between RP2 and RP1 (inter-restoration point difference bitmap) is created. Next, the inter-restoration point difference bitmap and the recovering difference bitmap are merged with each other. For the area in the merged bitmaps in which a difference bit is ON, the data is copied from the base volume 230B to the primary volume 230P, and the journal data including the journal data of RP2 is applied to the primary volume 230P. For the other areas, the data of the primary volume 230P is used directly.

The user or application program accepts the storage contents recovered by means of temporary restoration, and when execution of complete restoration is instructed (S38: NO, S41: YES), the storage controller 10 nullifies or discards the journal data JD from the defined restoration point to "I/O stop point" (S42). The journal data JD up to the "I/O stop point" is journal data JD that is created in response to the write request issued from the host 20 stopped at S30.

The storage controller 10 uses the recovering difference bitmap BM30, which is started to be used in S36, as the sectional difference bitmap BM20 (S43). The storage controller 10 then discards the sectional difference bitmap BM20 associated with the journal data JD that is nullified or discarded in S42 (S44). It should be noted that "discarded" is used for the sake of convenience, but the meaning of this expression also includes deletion of the storage contents of the sectional difference bitmap BM20. In other words, in S44, each sectional difference bitmap BM20 that is no longer required is discarded and prepared for reuse. The storage controller 10 discards the CPM included in the range of the journal data JD that is nullified or discarded (S45).

The storage controller 10 restart the reflection processing of the journal data JD (S46) and shifts the status to the normal operation state (S47).

The present embodiment is configured as described above, thus the following effects are achieved. In the present embodiment, the journal data JD after a lapse of the targeted protection period TPT are written to the base volume 230B during the normal operation, whereby the storage contents of the base volume 230B can be transferred as the storage contents obtained later than the storage contents of the primary volume 230P by the targeted protection period.

Therefore, in the present embodiment, the base point, which is a starting point of a period in which restoration can be performed, can be caused to follow a certain time period later than the current time. Since the journal data items JD that are written to the base volume 230B are discarded, the risk that the journal volume 230J is filled with the journal data items JD can be reduced.

In the present embodiment, the difference bitmaps BM20 are allocated respectively to a plurality of predetermined sections, and the difference between the primary volume 230P and the base volume 230B is managed for each section. Therefore, after the journal data items JD associated with the difference bitmaps BM20 are all written to the base volume 230B, the storage contents of the difference bitmaps BM20 can be deleted and reused. Accordingly, unwanted difference bitmaps BM20 can be prevented from being remaining stored in the memory areas of the storage controller 10, and the memory areas of the storage controller 10 can be used efficiently.

Moreover, the present embodiment is configured such that the sectional difference bitmaps BM20 are merged to create the difference bitmap BM10 for differential copy, and at the time of restoration the data is differentially copied from the base volume 230B to the primary volume 230P. Accordingly the amount of data to be copied from the base volume 230B to the primary volume 230P can be reduced, and the time required for recovery can be reduced.

Particularly, in the present embodiment, the difference bitmap BM10 indicating the position updated after the restoration point is used to copy the data from the base volume 230B to the primary volume 230P, only for the position updated after the restoration point. Therefore, the amount of data to be copied from the base volume 230B to the primary volume 230P can be reduced, whereby the time required in restoration can be reduced.

Moreover, in the present embodiment, for the areas updated before and after the restoration point respectively, the journal data items JD are written from the base point through the restoration point, and the storage contents of the restoration point are restored. Therefore, the time required in reflection processing can be reduced, whereby the time required in restoration can be further reduced.

Embodiment 2

The second embodiment is described with reference to FIG. 10 through FIG. 15. Each of the embodiments including the present embodiment corresponds to a modification of the above-described first embodiment. The above embodiment has described the case in which the difference bitmap indicating the difference in storage contents obtained after the restoration point is created, and restoration is executed using the storage contents of the primary volume 230P as much as possible. In the present embodiment, a plurality of difference bitmaps indicating the differences obtained before and after the restoration point are prepared, and restoration is executed using the storage contents of the primary volume 230P and of the base volume 230B as much as possible.

Figure 13:
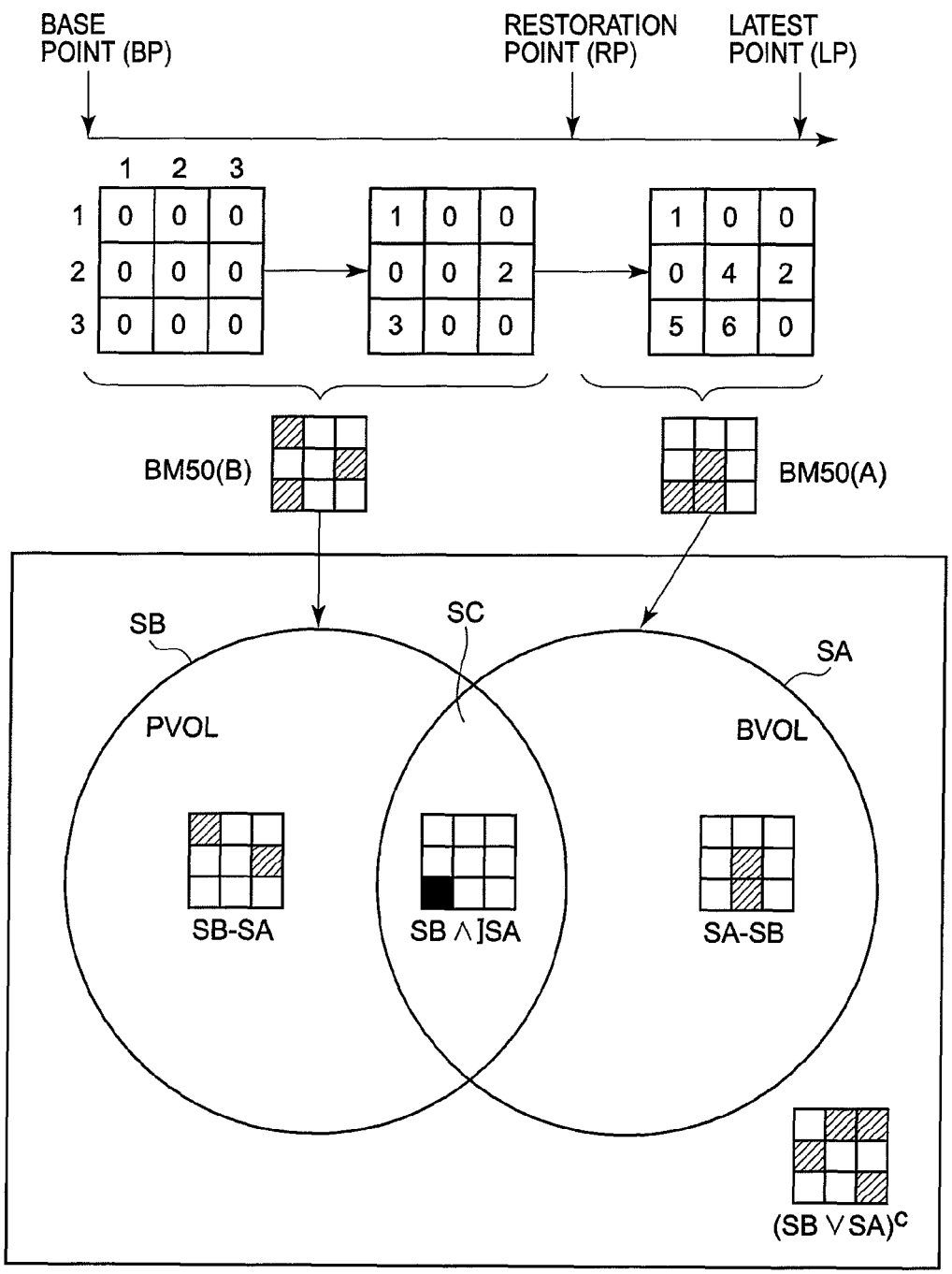
FIG. 13 is an explanatory diagram schematically showing the recovery processing performed in the storage controller of a second embodiment.

FIG. 13 shows a state in which the storage contents of the primary volume 230P change during a period between the base point BP and the latest point LP. When the restoration point RP is specified and execution of restoration is requested, the storage controller 10 creates a difference bitmap BM50 (A) indicating the position updated after the restoration point and a difference bitmap BM50 (B) indicating the position updated before the restoration point.

Each of the difference bitmaps BM50 (A), BM50 (B) is created by merging the difference bitmaps BM20 of the respective sections before and after the restoration point, as described in the first embodiment. Alternatively, more accurate difference bitmaps BM50 (A), BM50 (B) an be generated using the management data of the journal data JD.

As already described with reference to FIG. 1, the area updated in the difference bitmap BM50 (A) after the restoration point (shaded areas) corresponds to the first update area. The area updated in the in the difference bitmap BM50 (B) before the restoration point corresponds to the second update area. The area updated in both the difference bitmaps BM50 (A), BM50 (B) corresponds to the third update area. The area that is not updated in both the difference bitmaps BM50 (A), BM50 (B) corresponds an unupdate area.

A first group SA is an area in which the occurrence of update is detected by the difference bitmap BM50 (A) after the restoration point. Basically the data of the base volume 230B can be used in the areas belonging to the first group SA. Particularly in the areas belonging only to the first group SA (SA−SB, (¬SB)∧SA), the data stored in the base volume 230B can be used directly. The areas (2, 2) and (2, 3) belonging only to the first group SA are updated only after the restoration point but are not updated before the restoration point. Therefore, in the areas (2, 2) and (2, 3) belonging only to the first group SA, the data "0" of the base volume 230B matches the data "0" obtained at the restoration point.

A second group SB is an area in which the occurrence of update is detected by the difference bitmap BM50 (B) before the restoration point. Basically the data of the primary volume 230P can be used in the areas belonging to the second group SB. Particularly in the areas belonging only to the second group SB (SB−SA, SB∧(¬SA)), the data stored in the primary volume 230P can be used directly. The areas (1, 1) and (3, 2) belonging only to the second group SB are updated only before the restoration point but are not updated after the restoration point. Therefore, in the areas (1, 1) and (3, 2) belonging only to the second group SB, the data "1" (1, 1) and "2" (3, 2) of the primary volume 230P match the data "1" (1, 1) and "2" (3, 2) obtained at the restoration point.

A third group SC is an area belonging to both the first group SA and the second group SB. Any of the data of the primary volume 230P and the base volume 230B cannot be used in the area belonging to the third group SC (SB∧SA). The area belonging to the third group SC (1, 3) is updated before and after the restoration point, thus, first, the data "0" of the base volume 230B is copied to the primary volume 230P ("5"→"0"), then the journal data items JD up to the restoration point, which are related to the area (1, 3), are sequentially written over the area (1, 3) ("0"→"3"). Accordingly, the data of the area belonging to the third group SC match the data of the restoration point.

A fourth group is an area that does not belong to any of the groups SA, SB and SC in the entire storage area of the primary volume 230P ((SB∨SA)$^c$, ¬(SB∨SA)). The areas belonging to the fourth group are not updated before or after the restoration point, thus the data stored in either the primary volume 230P or the base volume 230B can be used. In the areas belonging to the fourth group, (2, 1), (2, 2), (1, 2) and (3, 3), the data stored in the primary volume 230P, the data stored in the base volume 230B, and the data obtained at the restoration point match with one another.

In the present embodiment, a volume reference table BM60 for associating a virtual volume 230V, the primary volume 230P, the base volume 230B and the like with one another is created on the basis of the overviews described above. In this table BM60, whether to reference the primary volume 230P ("P"), whether to reference to the base volume 230B ("B"), and whether to use the journal data JD ("J") are set for each storage area of the primary volume 230P. It should be noted that the values "P", "B" and "J" are used for convenience of explanation.

Figure 14:
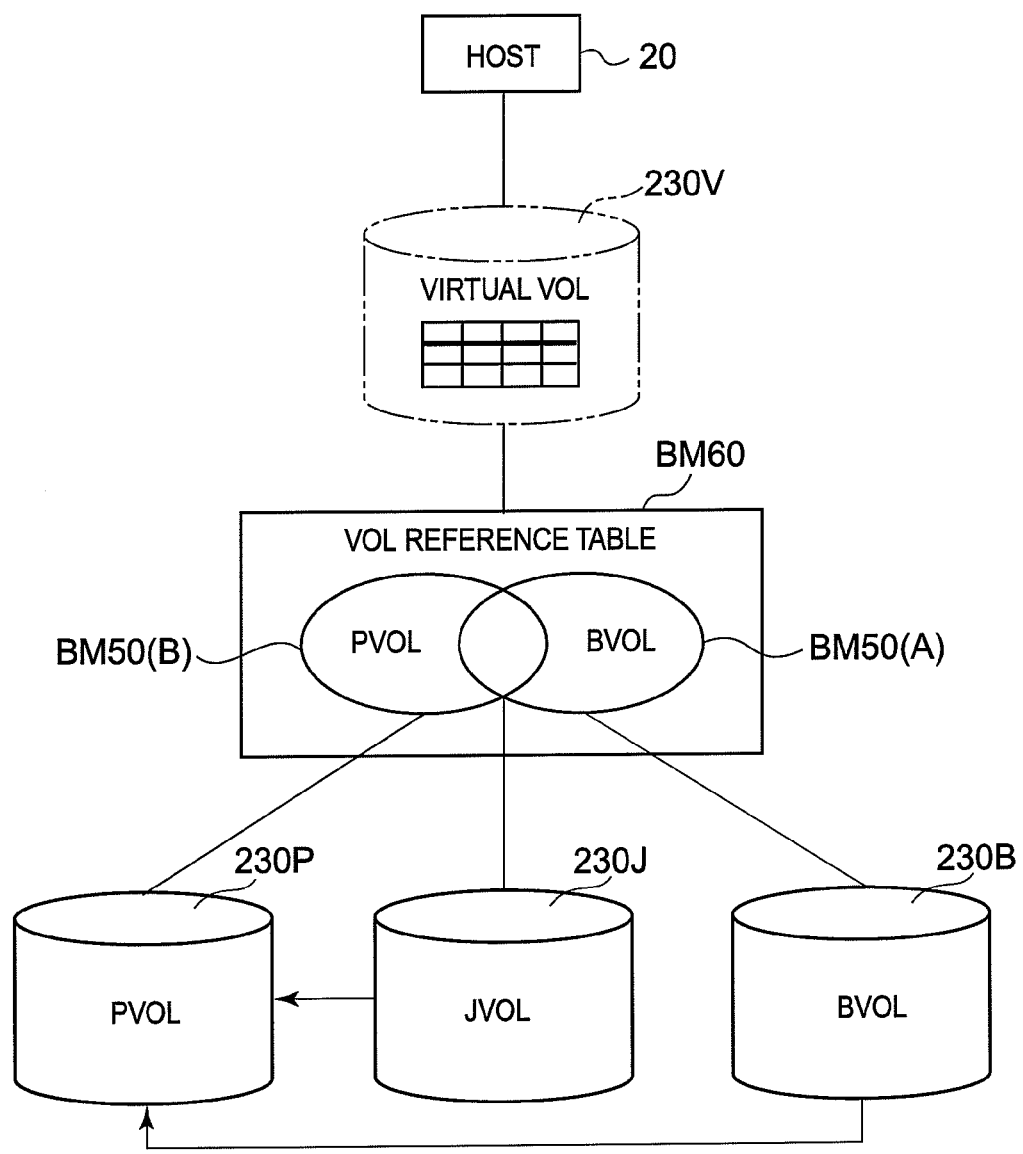
FIG. 14 is an explanatory diagram showing a situation in which a virtual volume, a primary volume, and a base volume are associated with one another by means of a reference table.

FIG. 14 is an explanatory diagram schematically showing the relationship of the virtual volume 230V to the table BM60 and each of the volumes 230P, 230B and the like. The virtual volume 230V is a volume provided virtually on the cache memory 130. The storage contents obtained at the restoration point are realized in the virtual volume 230V.

At the time when the reference table BM60 is created and is associated with the virtual volume 230V, restoration can be completed apparently. When the host 20 accesses the virtual volume 230V, a volume corresponding to the accessed position is referenced. When the host 20 accesses the area (SA) associated with the base volume 230B, the data of the base volume 230B is copied to the primary volume 230P. Specifically, it is not necessary to copy the data from the base volume 230B to the primary volume 230P until access is made from the host 20. It should be noted that, in the case of write access, after the data is copied from the base volume 230B to the primary volume 230P, the write data may be overwritten.

In the case of read access, the data may be read out from the base volume 230B, and it is not necessary to copy the data from the base volume 230B to the primary volume 230P.

A configuration is possible in which instead of copying the data from the base volume 230B to the primary volume 230P after the write access, copy is continued in the background after completion of restoration.

Figure 15:
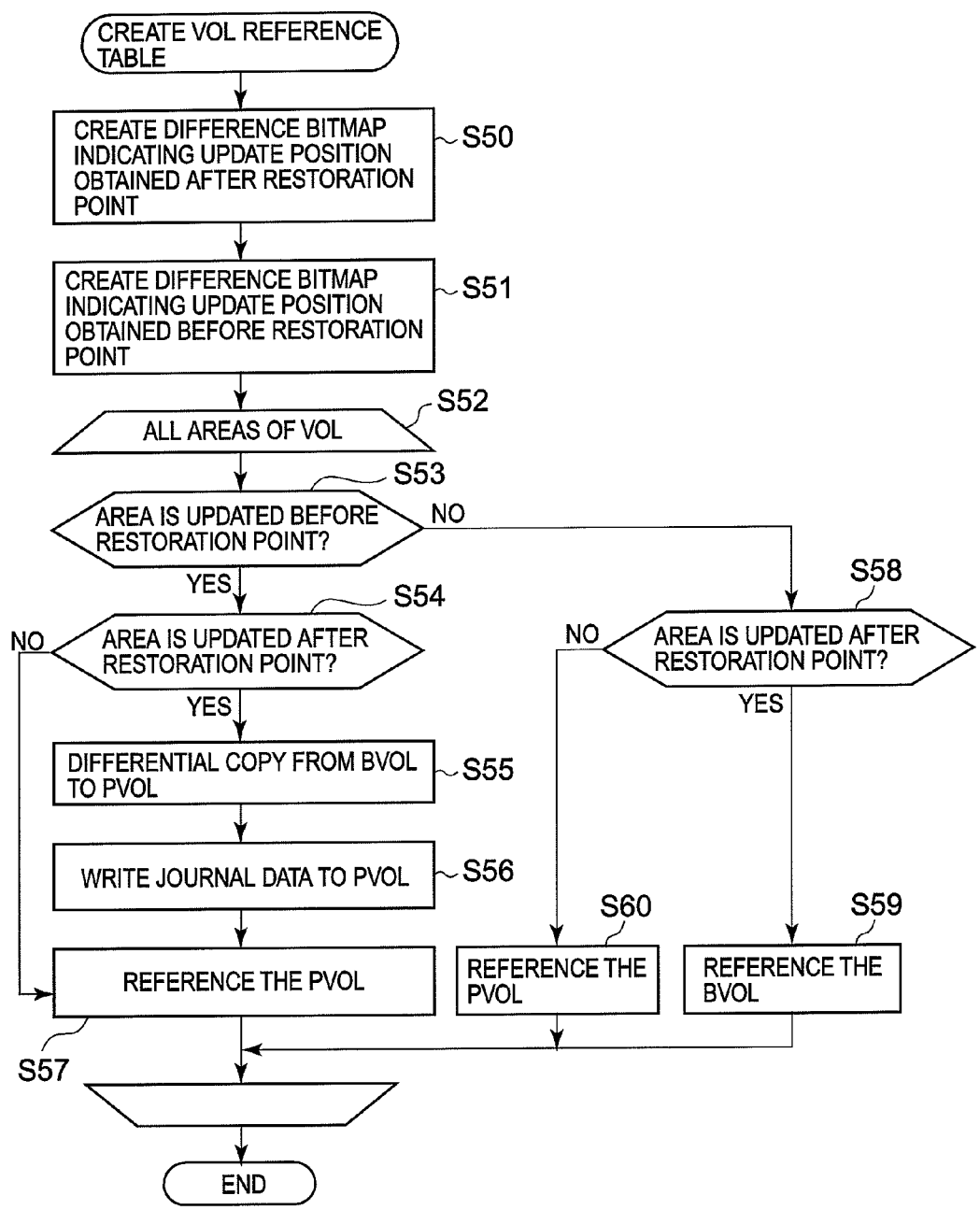
FIG. 15 is a flowchart showing processing for creating the reference table.

FIG. 15 shows the processing for creating the reference table BM60. The storage controller 10 creates the difference bitmap BM50 (A) indicating an update position obtained after the restoration point (S50). The storage controller 10 further creates the difference bitmap BM50 (B) indicating an update position obtained before the restoration point (S51).

The storage controller 10 appropriately executes the following steps S53 through S60 on all storage areas of the virtual volume 230V, and thereby set each value in each area of the reference table BM60 (S52).

The storage controller 10 determines whether a certain target area of the virtual volume 230V is updated before the restoration point or not (S53). If the target area is updated before the restoration point (S53: YES), the storage controller 10 determines whether the target area is updated after the restoration point or not (S54). It should be noted that the determination can be performed in S54 before S53.

When the target area is updated both before and after the restoration (S53: YES, S54: YES), the target area belongs to the third group SC shown in FIG. 13. Therefore, the storage controller 10 copies only the data of the target area from the base volume 230B to the primary volume 230P (S55), and sequentially writes journal data items JD up to the restoration, which are related to the target area, to the primary volumes 230P (S56). The storage controller 10 sets the values in the reference table BM60 in order to reference the primary volume 230P for the target area (S57).

When the target area is updated only before the restoration point (S53: YES, S54: NO), the target area belongs to the second group SB shown in FIG. 13. Therefore, the storage controller 10 sets the values in the reference table BM60 in order to reference the primary volume 230P for the target area (S57).

When the target area is not updated before the restoration point (S53: NO), the storage controller 10 determines whether the target area is updated after the restoration point (S58). IF the target area is updated only after the restoration point (S53: NO, S58: YES), the target area belongs to the first group SA shown in FIG. 13. Therefore, the storage controller 10 sets the values in the reference table BM60 in order to reference the base volume 230B for the target area (S59).

When the target area is not updated before or after the restoration point (S53: NO, S58: NO), the target area belongs to the fourth group shown in FIG. 13. Therefore, the storage controller 10 sets the values in the reference table BM60 in order to reference the primary volume 230P for the target area (S60).

The present embodiment that is also configured as described above achieves the same effects as those of the first embodiment. In addition, in the present embodiment, the difference bitmap BM50 (A) indicating the difference obtained after the restoration point and the difference bitmap BM50 (B) indicating the difference obtained before the restoration point are prepared, and the virtual volume 230V can be created using the storage contents of the primary volume 230P and of the base volume 230B as much as possible. Therefore, the time required in restoration can be reduced, improving the usability.

Embodiment 3

Figure 16:
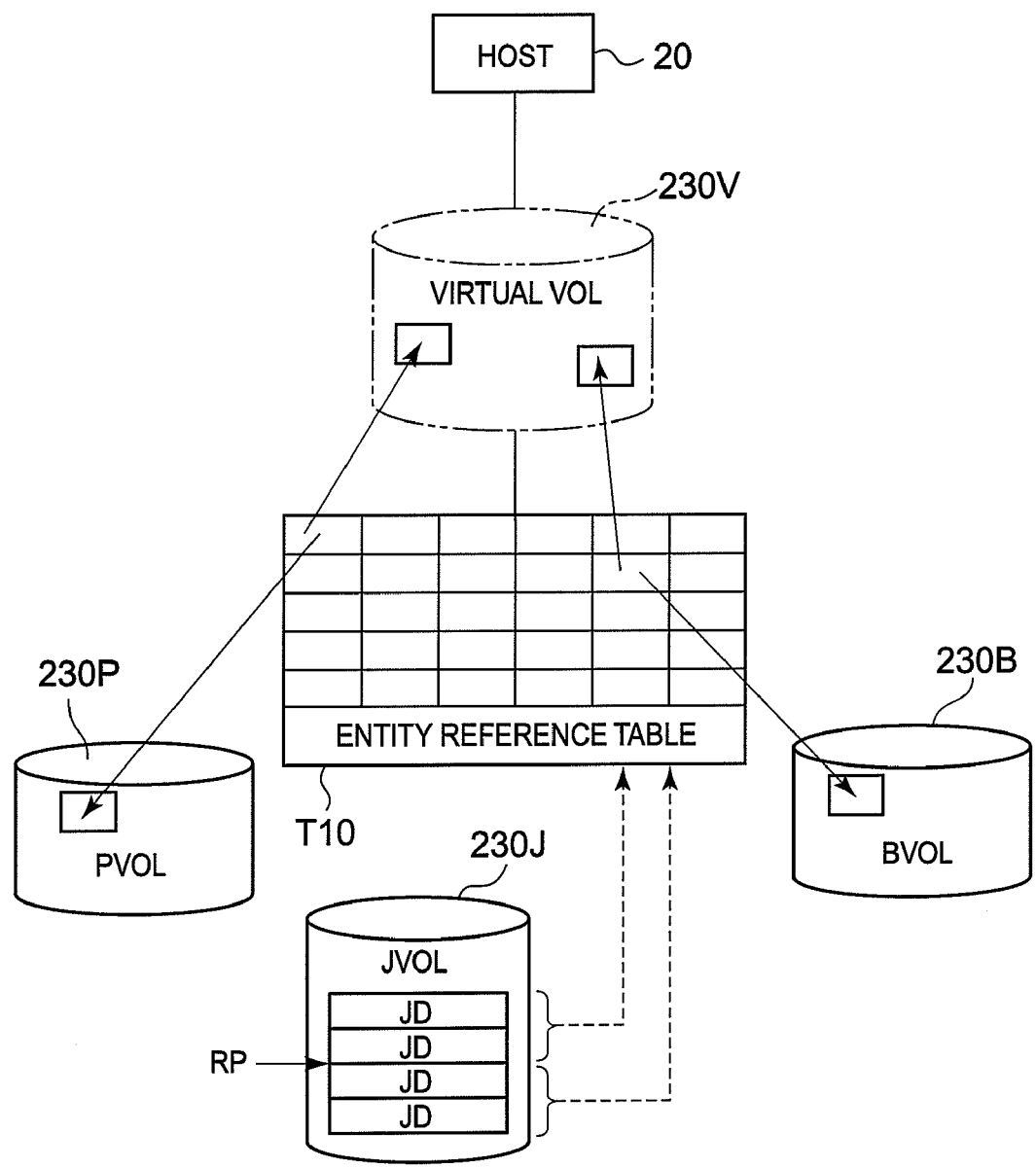
FIG. 16 is an explanatory diagram schematically showing the recovery processing performed in the storage controller of a third embodiment.

The third embodiment is described with reference to FIG. 16 and FIG. 17. In the present embodiment, the management data of the journal data JD is used to create a reference table T10 at the time of restoration. FIG. 16 is an explanatory diagram showing a general outline of the present embodiment. The reference table T10 for indicating in which volume the data entity of each area exists is associated with the virtual volume 230V providing the storage contents of the restoration point to the host 20.

In the reference table T10, the place where the data entity exists is set in predetermined units such as block units. The reference table T10 can be created at the time of restoration by using the management data of the journal data JD. As described with reference to FIG. 5, the data for managing the journal data JD contains management information the time at which any of the areas of the primary volume 230P is updated. Therefore, the storage controller 10 can obtain the reference table T10 by using such management data.

Figure 17:
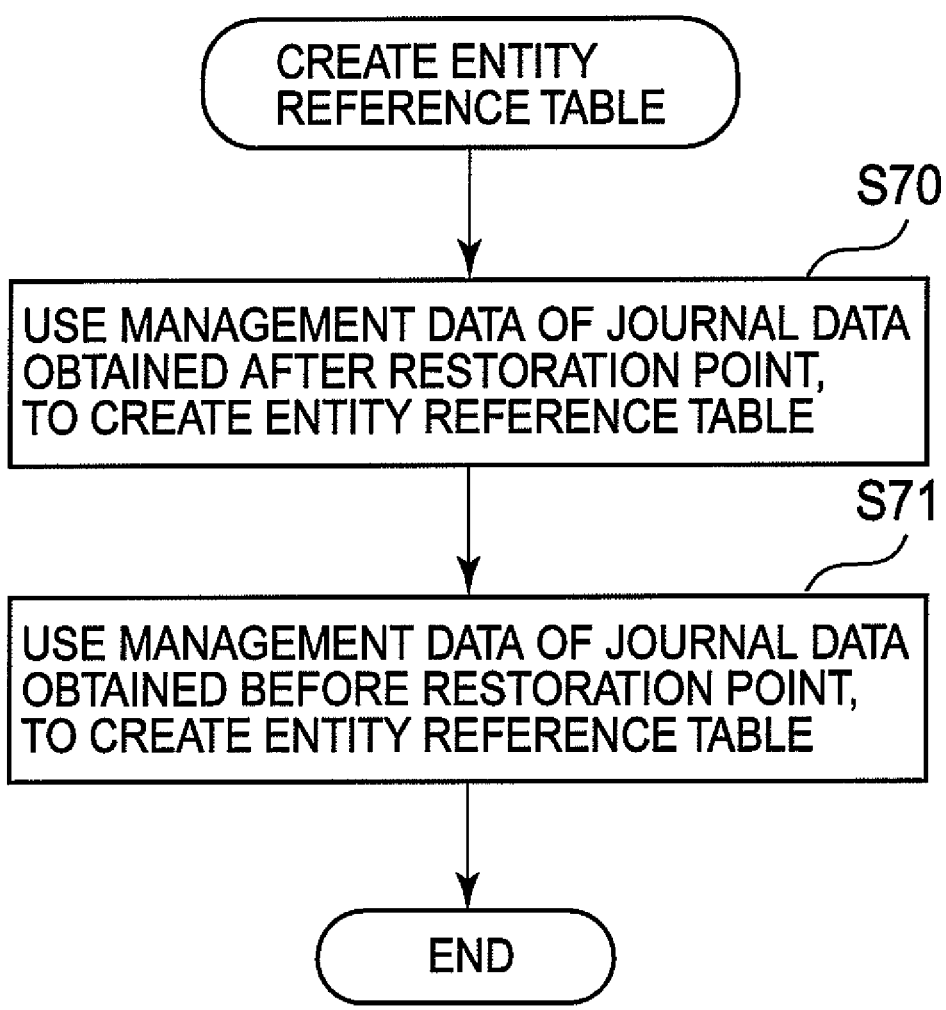
FIG. 17 is a flowchart showing processing for creating the reference table.

FIG. 17 shows an example of processing performed for creating the reference table T10. For example, the storage controller 10 uses the management data of the journal data JD obtained after the restoration point, to create a art of the reference table T10 (S70), and further uses the management data of the journal data JD obtained before the restoration point, to create the rest of the reference table T10 (S71).

The present embodiment that is also configured as described above achieves the same effects as those of the first embodiment and second embodiment. In the present embodiment, at the time when execution of restoration is requested, the reference table T10 can be created, thus the memory resource of the storage controller 10 can be used effectively.

Embodiment 4

Figure 18:
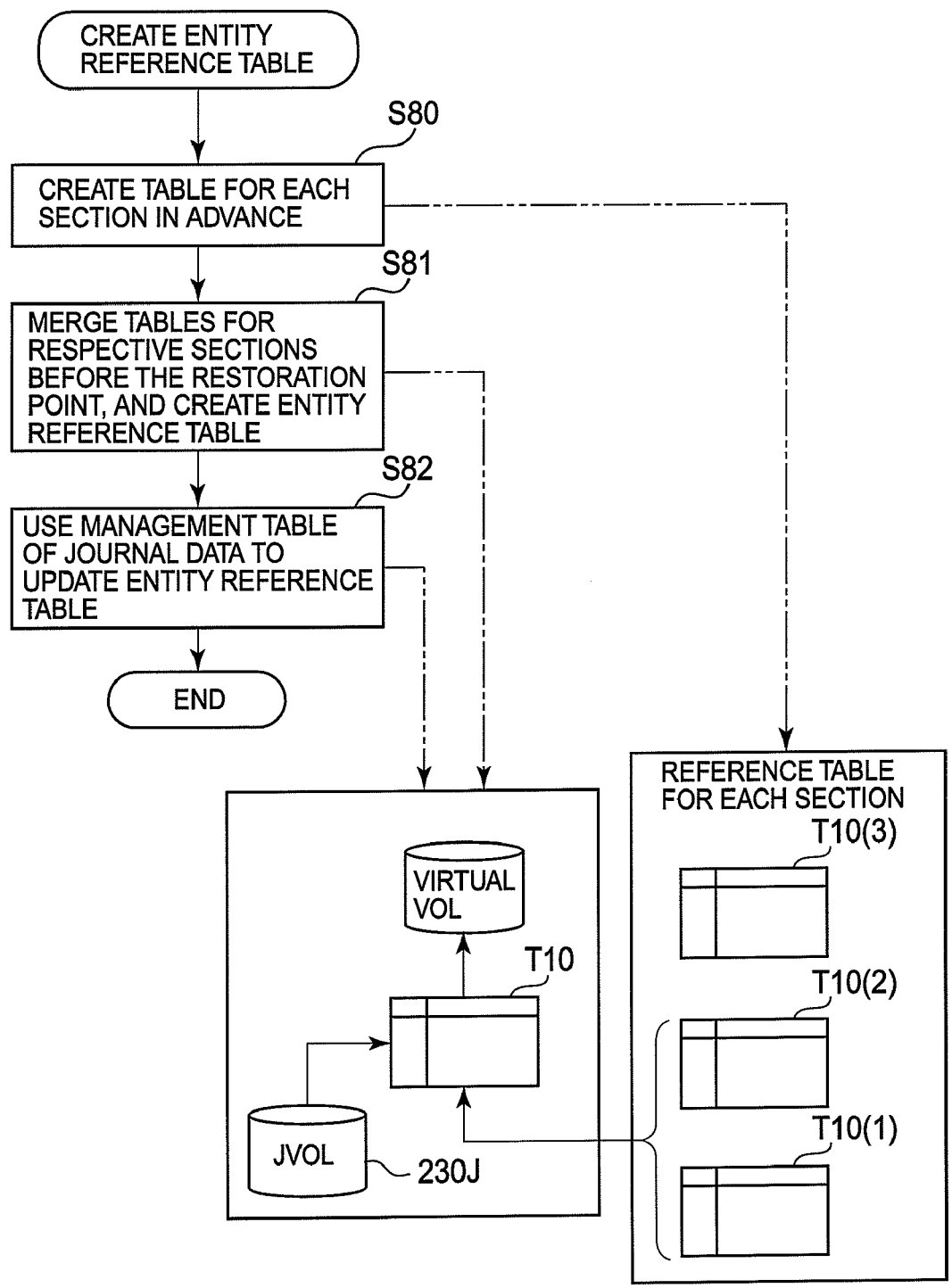
FIG. 18 is a flowchart showing processing for creating the reference table, which is performed by the storage controller of a fourth embodiment.

FIG. 18 is a flowchart showing a method of creating the reference table T10, which is executed by the storage controller 10 related to the fourth embodiment. In the present embodiment, a table is created for each section beforehand, and the reference table T10 is created using the table for each section, when restoration is requested.

The storage controller 10 creates the table for each section (S80). This table has the same configuration as the reference table T10. The table for each section manages whether the data of each area is updated or not, for each section. Hereinafter, this table is called "section table".

When start of restoration is requested, the storage controller 10 obtains a logical sum of the section tables obtained before the restoration point, to create the reference table T10 (S81). The storage controller 10 uses the management data related to the journal data JD obtained after the restoration point, and thereby updates the reference table T10 created in S81 (S82).

It should be noted that the section table that is in charge of a section including the restoration point cannot merge, thus the table is updated using the journal management information between the beginning of the section and the restoration point.

Even if the section management tables to be merged are simply merged, the tables are not updated after the restoration point, thus there is a possibility that the base volume 230B and the journal data JD are used in the area where the primary volume 230P can be referenced. Therefore, it is effective to merge only the section tables for the area that uses the base volume and the journal data, after creating three patterns of table as described in Embodiment 2.

The present embodiment that is also configured as described above achieves the same effects as those of the first embodiment and second embodiment. In addition, in the present embodiment, the table is created for each section before start of restoration is requested, thus the time required for creating the reference table T10 can be reduced. Accordingly, the time taken until the completion of restoration can be reduced, improving the usability.

Embodiment 5

The fifth embodiment is described with reference to FIG. 19 and FIG. 20. Each of the above-described embodiments describes the case in which the storage contents of the designated restoration point are realized on the primary volume 230P. In the present embodiment, on the other hand, storage contents different from those of the primary volume 230P are used to realize the storage contents of the restoration point. The present embodiment can be applied to any of the embodiments described above. Here, a case in which the present embodiment is applied to the second embodiment is described for convenience of explanation.

Figure 19:
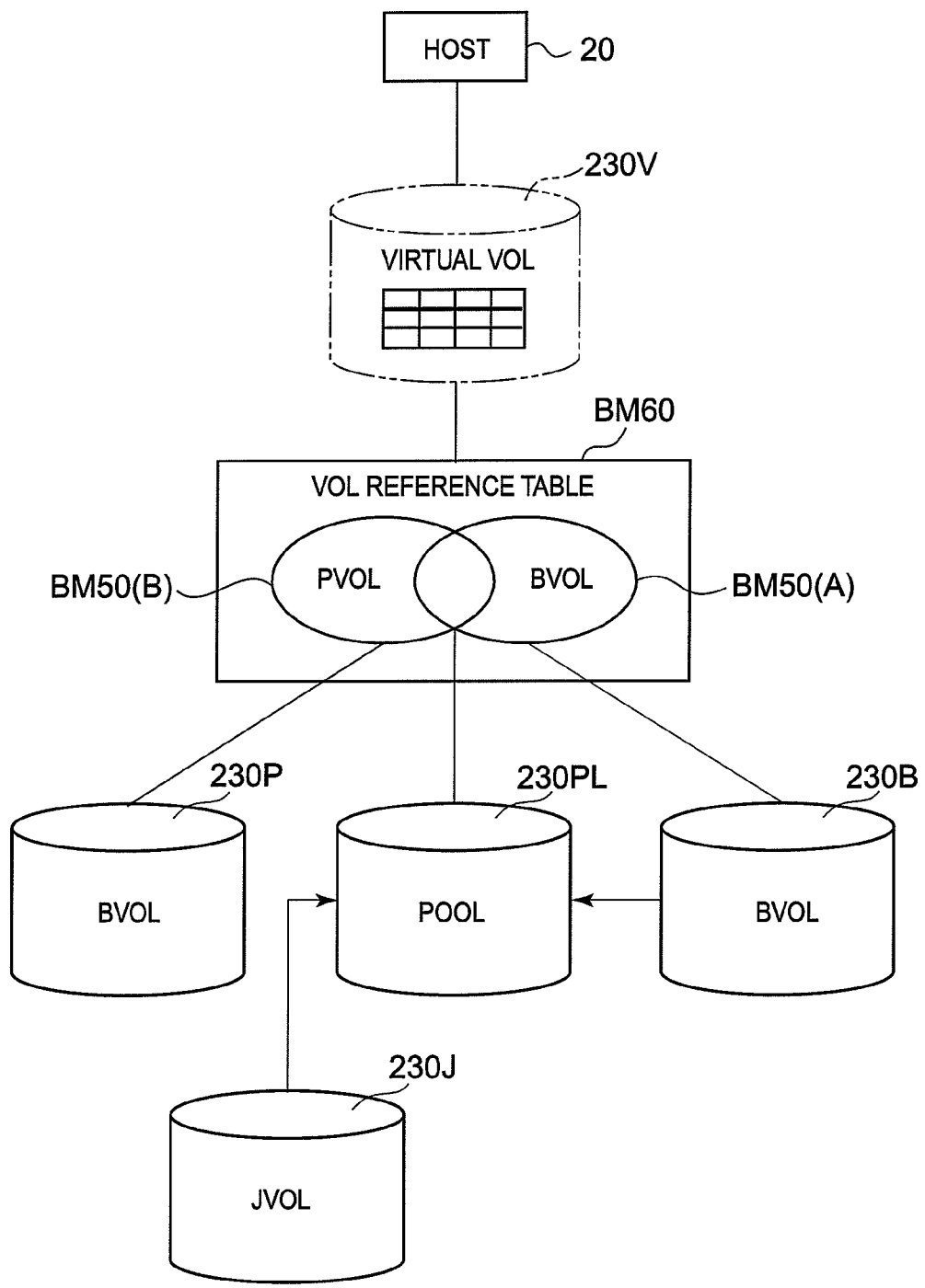
FIG. 19 is an explanatory diagram schematically showing the recovery processing performed in the storage controller of a fifth embodiment.

As shown in FIG. 19, the data of the area belonging to the third group SC are stored in a pool 230PL. The pool 230PL can be constituted by one or a plurality of storage areas of the volumes 230, which are different from the volumes 230P and 230B. If the journal volume 230J has sufficient free space, the free area of the journal volume 230J can be used as the pool 230PL.

Figure 20:
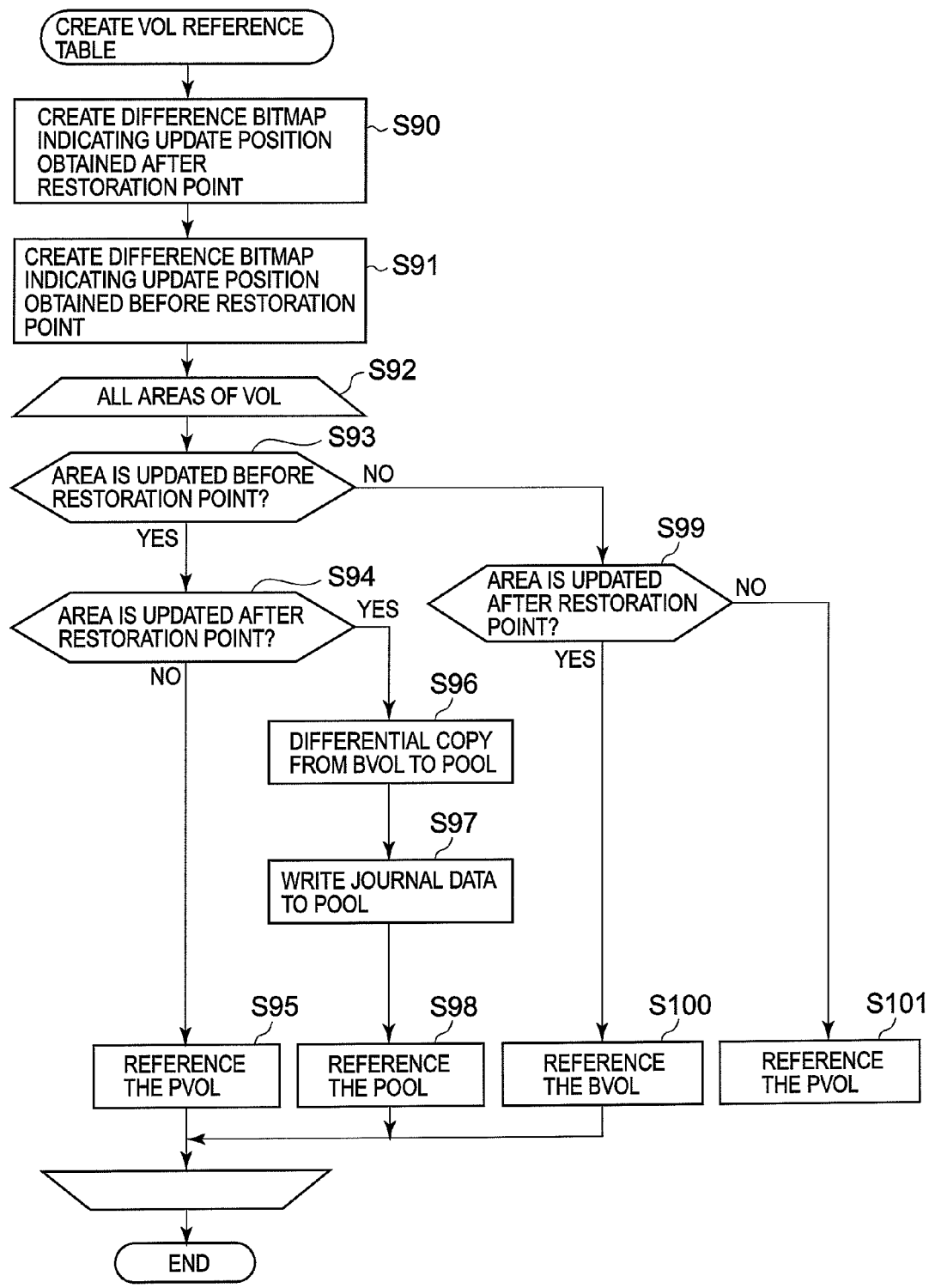
FIG. 20 is a flowchart showing processing for creating the reference table.

FIG. 20 shows processing for creating the reference table BM60. FIG. 20 has steps that are same as or similar to those shown in FIG. 15. To describe the relationship between the steps shown in FIG. 20 and the steps shown in FIG. 15, S90 corresponds to S50, S91 to S51, S92 to S52, S93 to S53, S94 to S54, S95 to S57, S99 to S58, S100 to S59, and S101 to S60. Description of each of these steps is omitted.

The present embodiment is characterized in the processing performed on the areas updated before and after the restoration point (S96, S97, S98). Specifically, for the areas that are updated before and after the restoration point (areas belonging to the third group SC), after the data is copied from the base volume 230B to the pool 230PL (S96), the journal data items JD related to these areas and obtained up to the restoration point are sequentially written over the pool 230PL (S97). Then, in the reference table BM60, a value for specifying a predetermined section of the pool 230PL is set as information indicating the place for referencing the areas.

The present embodiment that is also configured as described above achieve the effects same as those of the first embodiment and the second embodiment. In addition, in the present embodiment, the storage contents of the restoration point can b realized on the pool 230PL. Therefore, the storage contents of the restoration point can be obtained promptly without changing the primary volume 230P holding the storage contents of the latest point.

Also, by performing restoration using the pool 230PL, an access made to the primary volume 230P is processed and at the same time restoration can be performed. In the case of write access made to the area referencing the primary volume 230P, the data is copied from the primary volume 230P to the pool 230PL, the table is updated so as to reference the pool 230PL, and then the write access is accepted.

It should be noted that, even in the case in which the storage contents of the restoration point are realized on the primary volume 230P, the pool 230PL can be used. For example, such case is described based on Embodiment 2 as follows:

(1) the configuration in which the data is copied from the base volume to the primary volume is replaced with the configuration in which the data is copied from the base volume to the pool;

(2) the configuration in which the journal data is reflected in the primary volume after copying the data from the base volume to the primary volume is replaced with the configuration in which the journal data is reflected in the pool after copying the data from the base volume to the pool;

(3) for the area write-accessed after restoration, the data is copied from the primary volume 230P to the pool, and the write data is written to the pool; or (4) for the area write-accessed after restoration, the data is copied from the base volume 230B to the pool, and the write data is written to the pool.

By using the pool 230PL in this manner, the processing of copying the data obtained at the previous temporary restoration or the processing of canceling the write access after restoration at the time of re-execution of temporary restoration is no longer required. Therefore, the time required in restoration can be reduced. It should be noted that the configurations of (3) and (4) described above are effective in Embodiment 3 and Embodiment 4.

Embodiment 6

The sixth embodiment is described with reference to FIG. 21 and FIG. 22. The journal data items JD are sequentially written, starting from the journal data that is close to the restoration point in terms of time, over the data of the base volume 230B, whereby the reflection processing can be completed in a short period of time.

Figure 21:
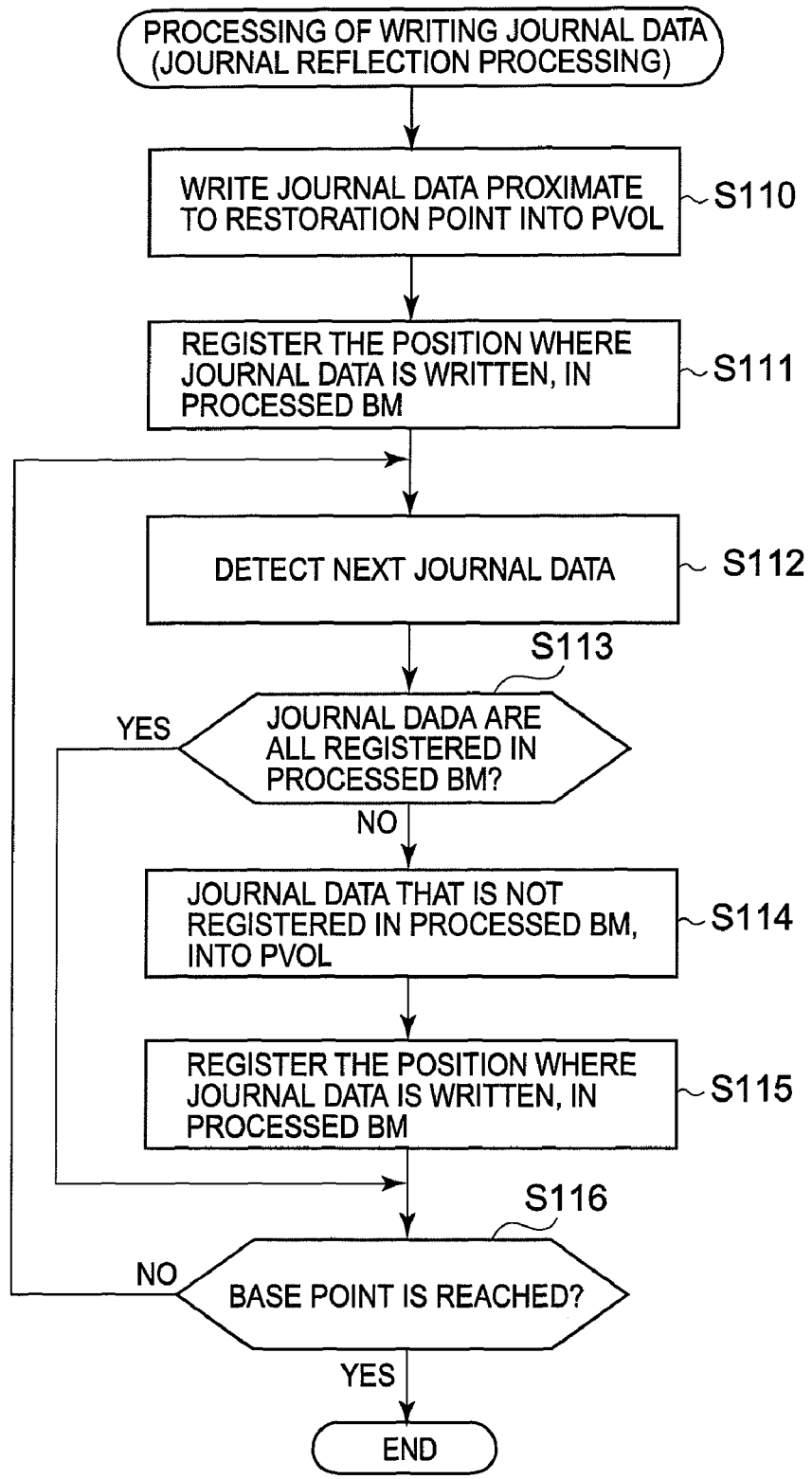
FIG. 21 is a flowchart showing a journal data reflecting processing, which is executed by the storage controller of a sixth embodiment.

FIG. 21 is a flowchart showing a general outline of the reflection processing according to the present embodiment. The storage controller 10 detects the journal data JD that is proximate to the restoration point in terms of time, and writes the journal data to an update target area of the primary volume 230P (S110). The present embodiment describes an example of realizing the storage contents of the restoration point on the primary volume 230P, but the present embodiment can be applied to a configuration in which the storage contents of the restoration point are realized on another volume or the pool 230PL, as described in the fifth embodiment.

In the case of the third embodiment and the fourth embodiment as well, journal management information items are read sequentially to create the table, thus the method according to the present embodiment can be used. In this case, the section indicating "write to the primary volume" shown in FIG. 21 is changed to "update the table" indicating the journal data.

The storage controller 10 records, in a processed bitmap BM70, the position of the update target area to which the journal data JD proximate to the restoration point is written (S111). The processed bitmap BM70 shown in FIG. 22 described hereinafter is data for managing the positions of areas to which journal data is written.

The storage controller 10 detects journal data JD that is close to the restoration point and is subsequent to the journal data JD proximate to the restoration point in terms of time (S112). The storage controller 10 uses the processed bitmap BM70 to determine whether the areas corresponding to the second journal data JD close to the restoration point (target journal data JD) are already subjected to the reflection processing (S113). Specifically, the storage controller 10 determines whether all areas corresponding to the target journal data JD are registered in the processed bitmap BM70 (S113). It should be noted that the areas of journal data may not completely overlapped with one another but may be partially overlapped. In this case, only the sections that are not overlapped are reflected.

In the case in which the target journal data JD are not registered in the processed bitmap BM70 (S113: NO), the storage controller 10 writes, of the journal data JD, journal data JD that are not registered in the processed bitmap BM70 to the primary volume (S114), and records the written positions in the processed bitmap (S115). In the case in which the areas related to the target journal data JD are already registered in the processed bitmap BM70 (S113: YES), the storage controller 10 skips S114 and S115. Specifically, for the areas that are already reflected, update of the areas by means of the old journal data JD is prohibited.

Finally, the storage controller 10 determines whether the reflection processing is returned to the base point or not (S116). Specifically, the storage controller 10 determines whether the reflection processing is performed on the oldest journal data JD (S116). If there are unprocessed journal data JD (S116: YES), the storage controller 10 detects other journal data JD close to the restoration point (S112), and repeats the accomplished steps (S113 through S116). Once determination is finished on all journal data items JD (S116: YES), the present processing is ended.

Figure 22:
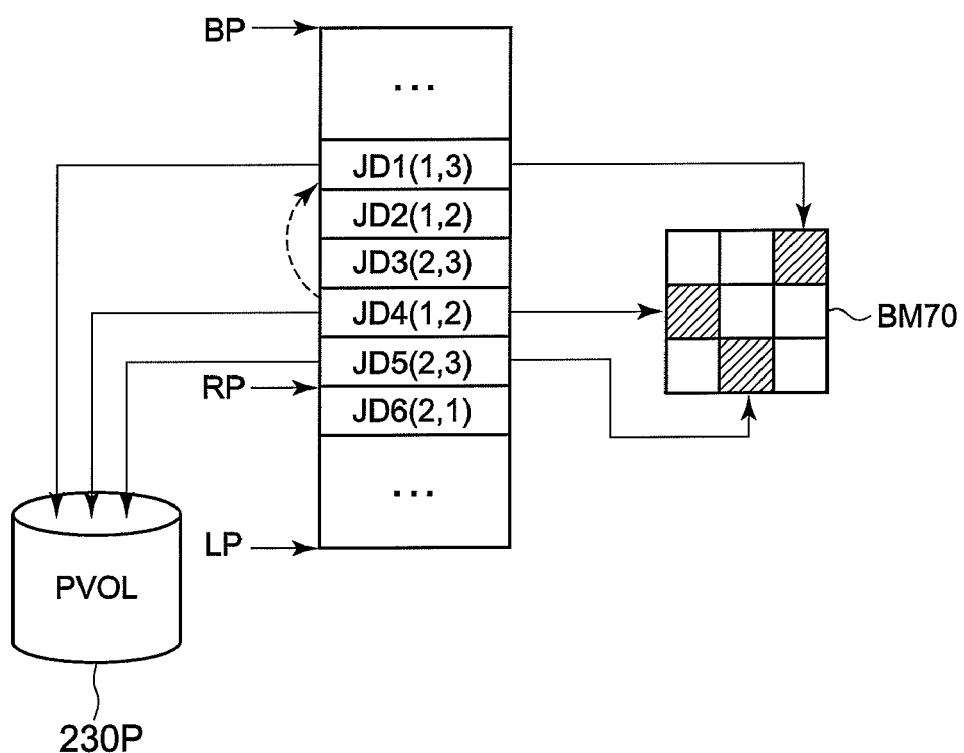
FIG. 22 is an explanatory diagram showing a situation in which the journal data is written to a volume.

FIG. 22 is a schematic diagram showing a state in which the journal data JD are written to the primary volume 230P, starting from the journal data proximate to the restoration point. First of all, the storage controller 10 reads past journal data JD5 proximate to the restoration point RP, out of the journal data items JD stored in the journal volume 230J, and writes the read journal data to the primary volume 230P. The storage controller 10 records the position (2, 3) where the journal data JD5 is written, in the processed bitmap BM70.

Next, the storage controller 10 reads journal data JD4 that is next close to the restoration point, writes the read journal data to the primary volume 230P, and registers the written position (1, 2) in the processed bitmap BM70.

Journal data JD3 that is close to the restoration point and subsequent to the journal data JD4 is data related to the area (2, 3). In this area (2, 3), the journal data JD5 that is created at earlier time than the journal data JD3 (time close to the restoration point) is already written. Therefore, the storage controller 10 takes the next journal data JD2 as the target of processing, without writing the journal data JD3 to the primary volume 230P.

The journal data JD2 is data related to the area (1, 2). In this area (1, 2), the journal data JD4 that is created at earlier time than the journal data JD2 is already written. Therefore, the storage controller 10 takes the next journal data JD1 as the target of processing, without writing the journal data JD2 to the primary volume.

The journal data JD1 is data related to the area (1, 3), and journal data is not yet written in the area (1, 3). Therefore, the storage controller 10 writes the journal data JD1 to the primary volume 230P.

As described above, in the present embodiment, the journal data are sequentially written to the primary volume 230P, starting from newer journal data, so as to trace back to the base point from the restoration point, and the storage contents are updated. The processed bitmap BM70 manages whether the storage contents are updated or not. Old journal data items are not written over the area in which the journal data close to the restoration point is written. Only one journal data item obtained at the latest time is written to each area to be updated in order to return the storage contents of the primary volume 230P to the restoration point.

The present embodiment that is also configured as described above achieves the same effects as those of the first embodiment and the second embodiment. In addition, in the present embodiment, only the journal data proximate to the reflection point are reflected for the areas to be updated, thus the storage contents of the restoration point can be obtained more promptly, improving the usability.

Figure 23:
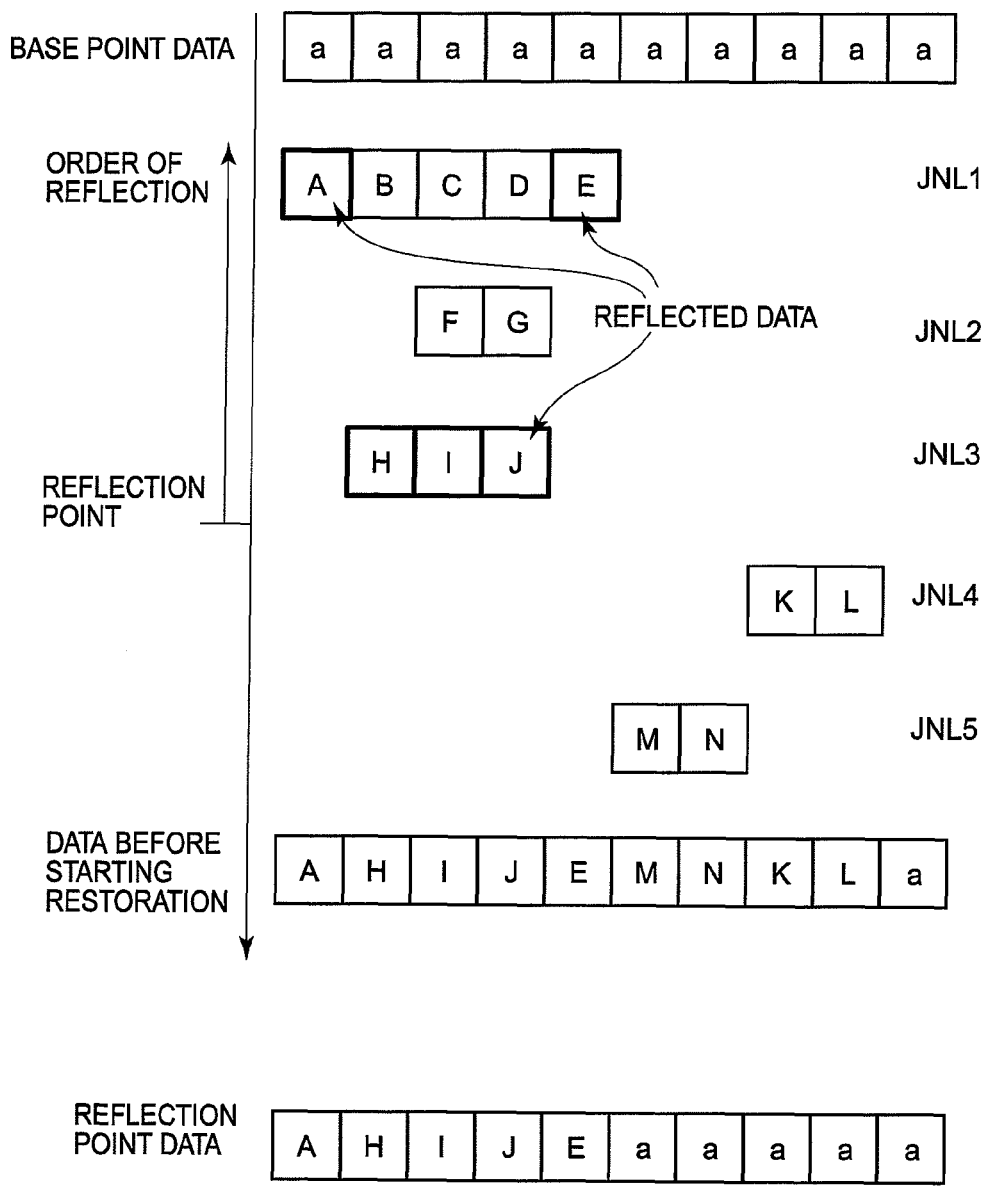
FIG. 23 is an explanatory diagram schematically showing a reflection method in the case in which the journal data partially overlaps.

As shown in FIG. 23, in the case in which first journal data JNL1 and third journal data JNL3 are partially overlapped with each other, only the data items shown by the solid lines in the figure are reflected.

Embodiment 7

Figure 24:
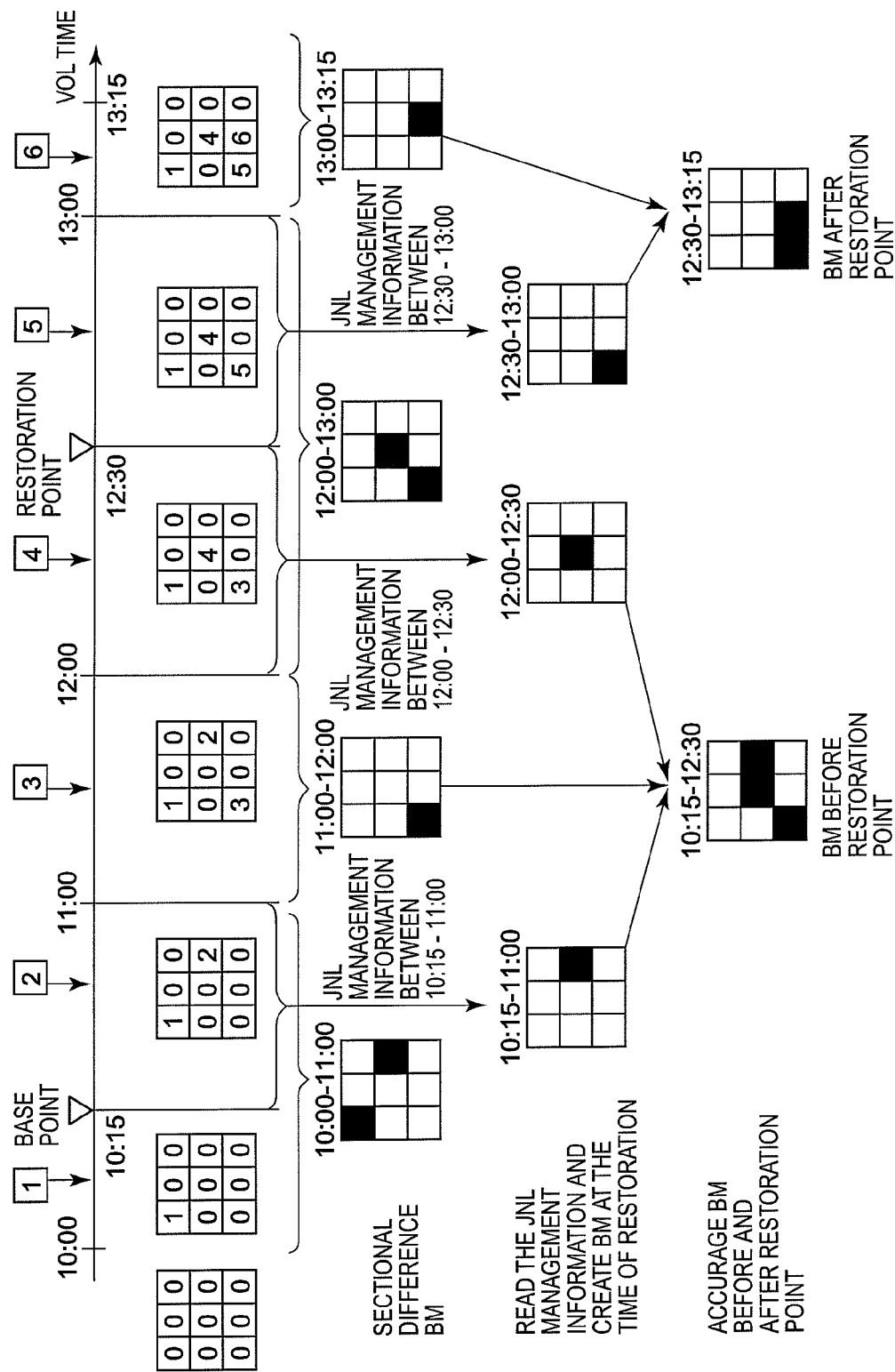
FIG. 24 is an explanatory diagram schematically showing a method for accurately creating a difference bitmap from journal management information.

FIG. 24 is an explanatory diagram showing an example of accurately creating a difference bitmap from the journal management information. In the example shown in the figure, a sectional difference bitmap is in charge of each of sections between 10 o'clock and 11 o'clock, between 11 o'clock and 12 o'clock, between 12 o'clock and 13 o'clock, and after 13 o'clock (between 13 o'clock and 13:15 which is the current time). The base point is 10:15, and the designated restoration point is 12:30.

The difference bitmap that is in charge of the section between 10 o'clock and 11 o'clock includes the difference obtained before the base point. Therefore, the journal management information between 10:15 and 11 o'clock is used to create a sectional difference bitmap for the section between 10:15 and 11 o'clock. This difference bitmap that is created using the journal management information is called "temporary bitmap" in order to distinguish it from the sectional difference bitmap.

The difference bitmap that is in charge of the section between 12 o'clock and 13 o'clock includes differences obtained before and after the restoration point (12:30). Therefore, the journal management information between 12 o'clock and 12:30 is used to create a temporary bitmap for the section between 12 o'clock and 12:30. Also, the journal management information between 12:30 and 13 o'clock is used to create a temporary bitmap for the section between 12:30 and 13 o'clock.

Then, the temporary bitmap for the section between 10:15 and 11 o'clock, the difference bitmap for the section between 11 o'clock and 12 o'clock, and the temporary bitmap for the section between 12 o'clock and 12:30 are merged so that a difference bitmap for the section between 10:15 and 12:30 can be obtained. This difference bitmap (10:15-12:30) indicates a difference obtained before the restoration point.

Moreover, by merging the temporary bitmap for the section between 12:30 and 13 o'clock and the difference bitmap taking charge of the current section (13:00-13:15), a difference bitmap for the section between 12:30 and 13:15 can be obtained. This difference bitmap (12:30-13:15) indicates a difference obtained after the restoration point.

As described above, by using the journal management information and the sectional difference bitmaps taking charge of respective sections, the difference bitmaps indicating updates made before and after the restoration point can be securely obtained from the sectional difference bitmaps that includes the base point and the restoration point.

It should be noted that the present invention is not limited to the abovementioned embodiments. Those skilled in the art can make various additions and changes within the scope of the present invention. For example, the embodiments described above can be combined appropriately and used.

What is claimed is:

1. A storage controller for storing data that is used by an external device, comprising:
   a first storage area that holds storage contents obtained at a latest point;
   a second storage area that holds storage contents obtained at a base point positioned before the latest point;
   an update history management section that manages an update history of the first storage area which is generated by an update request from the external device; and
   a controller that restores the storage contents of the first storage area that are obtained at a restoration point included in a period between the base point and the latest point, wherein
   the controller (1) detects a first update area that is updated during a first period between the restoration point and the latest point, a second update area that is updated during a second period between the base point and the restoration point, and a third update area that is common to the first update area and the second update area, (2) uses the storage contents of the second storage area with respect to the first update area, uses the storage contents of the first storage area with respect to the second update area, uses the storage contents of the second storage area and an update history obtained within the second period with respect to a third storage area, and uses the storage contents of either one of the first and second storage areas with respect to an unupdate area which is not updated during both the first period and the second period, and thereby (4) restores the storage contents of the first storage area that are obtained at the restoration point.

2. The storage controller according to claim 1, wherein the controller restores the storage contents of the first storage area, which are obtained at the restoration point, onto the first storage area.

3. The storage controller according to claim 2, wherein the controller restores the storage contents of the first storage area, which are obtained at the restoration point, onto the third storage area which is different from the first storage area and the second storage area.

4. The storage controller according to claim 1, wherein the controller restores the storage contents of the first storage area, which are obtained at the restoration point, onto a virtual storage area that is generated virtually.

5. The storage controller according to claim 1, wherein the controller (4-1) generates a virtual storage area corresponding to the first storage area, (4-2) associates an area corresponding to the first update area in the virtual storage area with an area corresponding to the first update area in the second storage area, (4-3) associates an area corresponding to the second update area in the virtual storage area with an area corresponding to the second update area in the first storage area, (4-4) associates an area corresponding to the unupdate area in the virtual storage area with an area corresponding to the unupdate area in either one of the first and second storage areas, (4-5) associates an area corresponding to the third update area in the virtual storage area with a predetermined area corresponding to the third update area in either one of the first and third storage areas, copies, to the predetermined area, storage contents stored in an area corresponding to the third update area in the second storage area, thereafter writes update histories related to the third update area over the predetermined area in a predetermined order, and thereby restores the storage contents of the first storage area that are obtained at the restoration point.

6. The storage controller according to claim 5, wherein the controller is configured such that the update histories related to the third update area are applied to the predetermined area so as to sequentially trace back to the past from a time point proximate to the restoration point.

7. The storage controller according to claim 6, wherein the controller does not overwrite in a place to which is applied an update history obtained at a time point close to the restoration point, even when there exists an update history obtained in an earlier time than the update history.

8. The storage controller according to claim 1, wherein the controller uses an update history managed by the update history management section to generate, in advance, information for detecting the first through third update areas, before the restoration point is designated.

9. The storage controller according to claim 1, wherein the controller manages, in advance, a position of a difference between the storage contents of the first storage area and the storage contents of the second storage area, for each of predetermined sections, on the basis of the update request issued from the external device during the period between the base point and the latest point, and detects the first through third update areas on the basis of the position of the difference of each section.

10. The storage controller according to claim 1, wherein the controller uses a plurality of first difference bitmaps to manage a position in which the difference in the storage contents is generated between the first storage area and the second storage area, for each of predetermined sections, detects the first update area from a logical sum of a plurality of the first difference bitmaps obtained after the restoration point, detects the second update area from a logical sum of a plurality of the first difference bitmaps obtained before the restoration point, and detects the third update area from an overlapping section between the first update area and the second update area.

11. The storage controller according to claim 1, wherein the first storage area and the second storage area are each configured as a logical volume, and the update history management section generates journal data items on the basis of the update request issued from the external device and saves the journal data items as the update histories.

12. The storage controller according to claim 1, wherein
   the controller generates a table for associating the first storage area with a virtual storage area generated virtually,
   the table is configured so as to associate an area corresponding to the first update area in the virtual storage area with an area corresponding to the first update area in the second storage area, associate an area corresponding to the second update area in the virtual storage area with an area corresponding to the first update area in the first storage area, and associate an area corresponding to the unupdate area in the virtual storage area with an area corresponding to the unupdate area in either one of the first and second storage areas, and an area corresponding to the third update area in the virtual storage area is set as an area for performing predetermined processing,
   the predetermined processing being processing for copying, to the predetermined area, storage contents that are stored in an area corresponding to the third update area in the second storage area, and thereafter overwriting update histories related to the third update area in a predetermined order.

13. A storage controller for storing data that is used by an external device, comprising:
- a first volume that holds storage contents obtained at a latest point;
- a second volume that holds storage contents of the first volume obtained at a base point;
- a third volume that stores journal data items generated based on an update request targeted to the first volume;
- a plurality of first difference bitmaps for managing a position at which a difference in storage contents between the first volume and the second volume is generated, for each of a plurality of predetermined sections; and
- a controller for controlling the first volume, the second volume, the third volume, and each of the first difference bitmaps, wherein the controller executes
  (1) a copy function for storing, in the second volume, the storage contents of the first volume that are obtained at a predetermined time point,
  (2) a journal generating function for generating the journal data items on the basis of the update request sent from the external device and causing the generated journal data items to be stored in the third volume,
  (3) a difference management function for causing the position, at which a difference between the first volume and the second volume is generated, to be stored in one of the first difference bitmaps, which is selected for each of the predetermined section, on the basis of the update request that is issued from the external device after the predetermined time point,
  (4) a reflection function for causing predetermined journal data items which are obtained after a lapse of a pre-designated targeted protection period, from among the journal data items stored in the third volume, to be reflected in the second volume,
  (5) a journal discarding function for discarding the predetermined journal data items reflected in the second volume,
  (6) a reusing function for deleting storage contents of a predetermined first difference bitmap from among the first difference bitmaps, the predetermined first difference bitmap having all corresponding journal data items discarded, and reusing thus obtained first difference bitmap as a new first difference bitmap, and
  (7) a restoration function, which, when a restoration point is designated and execution of restoration is commanded, (7-1) detects, from a logical sum of a plurality of the first difference bitmaps obtained after the restoration point, a first update area that is updated during a first period between the restoration point and the latest point, (7-2) detects, from a logical sum of a plurality of the first difference bitmaps obtained before the restoration point, a second update area that is updated during a second period between the base point and the restoration point, (7-3) detects a third update area that is common to both the first update area and the second update area, and (7-4) uses the storage contents of the second volume for the first update area, uses the storage contents of the first volume for the second update area, copies, to a predetermined area, storage contents stored in an area corresponding to the third update area in the second volume, for the third update area, and thereafter writes journal data items related to the third update area over the predetermined area in a predetermined order, and, for an unupdate area which is not updated during both the first period and the second period, uses the storage contents stored in either one of the first and second storage areas to acquire the storage contents of the first volume that are obtained at the restoration point.

14. A method for controlling a storage controller for storing data used by an external device, the method comprising the steps of:
- causing storage contents obtained at a latest point to be held in a first storage area;
- causing storage contents obtained at a base point positioned before the latest point to be held in a second storage area;
- causing an update history management section to manage an update history of the first storage area which is generated by an update request sent from the external device,
- detecting, when a restoration point is designated and restoration is commanded, a first update area that is updated during a first period between the restoration point and the latest point, a second update area that is updated during a second period between the base point and the restoration point, and a third update area that is common to both the first update area and the second update area; and
- using storage contents of the second storage area with respect to the first update area, using the storage contents of the first storage area with respect to the second update area, using the storage contents of the second storage area and an update history obtained during the second period with respect to the third update area, using the storage contents of either one of the first and second storage areas with respect to an unupdate area which is not updated during both the first period and the second period, and thereby restoring the storage contents of the first storage area that are obtained at the restoration point.

* * * * *